US012110913B2

(12) United States Patent
Huynh

(10) Patent No.: US 12,110,913 B2
(45) Date of Patent: Oct. 8, 2024

(54) ELECTRO-HYDRAULIC SERVO-VALVES AND RELATED METHODS

(71) Applicant: The Boeing Company, Arlington, VA (US)

(72) Inventor: Neal Van Huynh, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 263 days.

(21) Appl. No.: 17/497,579

(22) Filed: Oct. 8, 2021

(65) Prior Publication Data

US 2022/0252085 A1    Aug. 11, 2022

Related U.S. Application Data

(60) Provisional application No. 63/146,977, filed on Feb. 8, 2021.

(51) Int. Cl.
| | |
|---|---|
| *F15B 13/04* | (2006.01) |
| *B64C 13/40* | (2006.01) |
| *B64C 13/50* | (2006.01) |
| *F15B 13/043* | (2006.01) |
| *F15B 13/044* | (2006.01) |

(Continued)

(52) U.S. Cl.
CPC ...... *F15B 13/0407* (2013.01); *F15B 13/0436* (2013.01); *F15B 13/044* (2013.01); *F15B 21/008* (2013.01); *F15B 21/0423* (2019.01); *F15B 21/0427* (2019.01); *B64C 13/40* (2013.01); *B64C 13/50* (2013.01); *B64C 13/504* (2018.01); *F15B 2211/526* (2013.01); *F15B 2211/528* (2013.01); *F15B 2211/6303* (2013.01); *F15B 2211/6336* (2013.01); *F15B 2211/634* (2013.01)

(58) Field of Classification Search
CPC ............. F15B 13/0407; F15B 13/044; F15B 2211/528; F15B 13/0436; F15B 13/504; F15B 21/008; F15B 21/0423; F15B 2211/6303; F15B 2211/6336; F15B 2211/634; F15B 2211/8613; B64C 13/40
USPC ............. 251/36.47; 137/86, 625.6; 74/574.2; 248/562, 563, 564, 566, 567, 636
See application file for complete search history.

(56) References Cited

U.S. PATENT DOCUMENTS 2,620,776 A * 12/1952 Groves ................ F15B 21/10
  91/410
2,716,904 A *  9/1955 Schuldt ................ F02B 75/06
  74/574.2

(Continued)

OTHER PUBLICATIONS

Sae International, "Electrohydraulic Servovalves," ARP490, Rev. G, revised Apr. 2020, 78 pages.

*Primary Examiner* — William M McCalister
(74) *Attorney, Agent, or Firm* — Hanley, Flight & Zimmerman, LLC

(57) ABSTRACT

Electro-hydraulic servo-valves and related methods are disclosed herein. An example electro-hydraulic servo-valve includes an inlet to receive a fluid from a reservoir, a torque motor, a chamber, the fluid to return to the reservoir via the chamber, and a flexure tube coupled to the torque motor. At least a portion of the flexure tube is disposed in the chamber. The flexure tube includes a nozzle to deliver the fluid to an actuator. The example electro-hydraulic servo-valve includes a damper operatively coupled to the flexure tube. The damper is disposed in the chamber.

20 Claims, 14 Drawing Sheets

(51) Int. Cl.
  *F15B 21/00* (2006.01)
  *F15B 21/0423* (2019.01)
  *F15B 21/0427* (2019.01)

(56) References Cited

U.S. PATENT DOCUMENTS

| | | | | |
|---|---|---|---|---|
| 3,072,326 A | * | 1/1963 | Rohmann | G06G 5/00 |
| | | | | 137/86 |
| 3,464,290 A | * | 9/1969 | Van Den Brink | F16F 15/0237 |
| | | | | 74/5.5 |
| 3,727,625 A | * | 4/1973 | Nagumo | G05D 16/0616 |
| | | | | 137/86 |
| 4,384,700 A | * | 5/1983 | Thompson | B60N 2/505 |
| | | | | 248/550 |
| 4,764,083 A | * | 8/1988 | Kawai | F03B 3/128 |
| | | | | 464/170 |
| 4,802,648 A | * | 2/1989 | Decker | F16F 13/262 |
| | | | | 248/550 |
| 4,949,741 A | * | 8/1990 | Nowicki | F15B 13/044 |
| | | | | 137/625.65 |
| 5,286,013 A | * | 2/1994 | Seymour | F16F 15/023 |
| | | | | 267/140.13 |
| 6,126,137 A | * | 10/2000 | Helms | F16F 9/103 |
| | | | | 248/563 |
| 6,923,405 B2 | * | 8/2005 | Cline | B64C 13/341 |
| | | | | 244/99.4 |
| 8,322,679 B2 | * | 12/2012 | Chen | H05K 7/1497 |
| | | | | 248/576 |
| 8,424,832 B2 | * | 4/2013 | Robbins | A47C 31/126 |
| | | | | 296/65.01 |
| 8,807,307 B2 | * | 8/2014 | Choi | E04H 9/0237 |
| | | | | 248/562 |
| 8,899,393 B2 | * | 12/2014 | Kraner | G05B 19/404 |
| | | | | 188/380 |
| 9,713,307 B1 | * | 7/2017 | Raszga | G05B 19/46 |
| 2004/0135056 A1 | * | 7/2004 | Chuang | F16F 3/02 |
| | | | | 248/562 |
| 2005/0022590 A1 | * | 2/2005 | Huynh | G01L 5/22 |
| | | | | 73/170.02 |
| 2005/0116095 A1 | * | 6/2005 | Cline | B64C 13/044 |
| | | | | 244/99.9 |
| 2012/0006965 A1 | * | 1/2012 | Wang | F16F 7/1022 |
| | | | | 248/636 |
| 2014/0061428 A1 | * | 3/2014 | Chao | F16F 15/027 |
| | | | | 248/636 |
| 2016/0108987 A1 | * | 4/2016 | Williamson | F16F 15/08 |
| | | | | 15/98 |

* cited by examiner

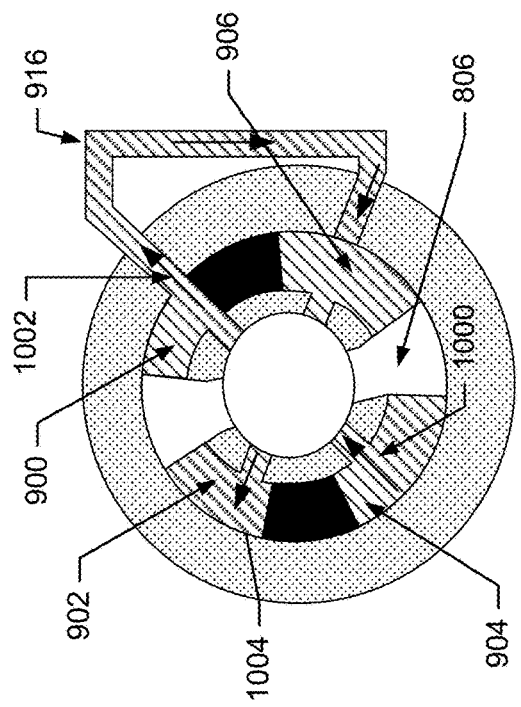
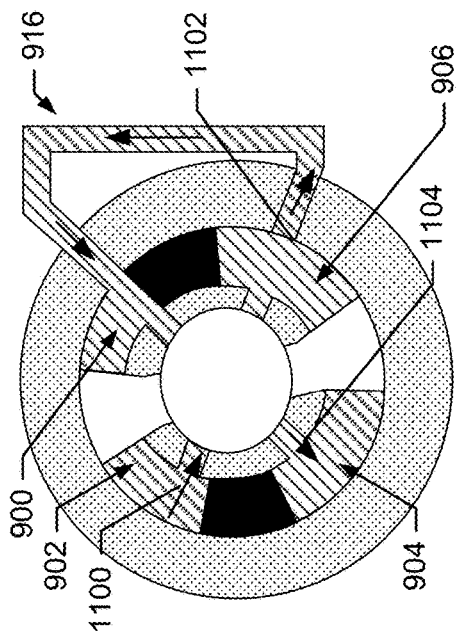
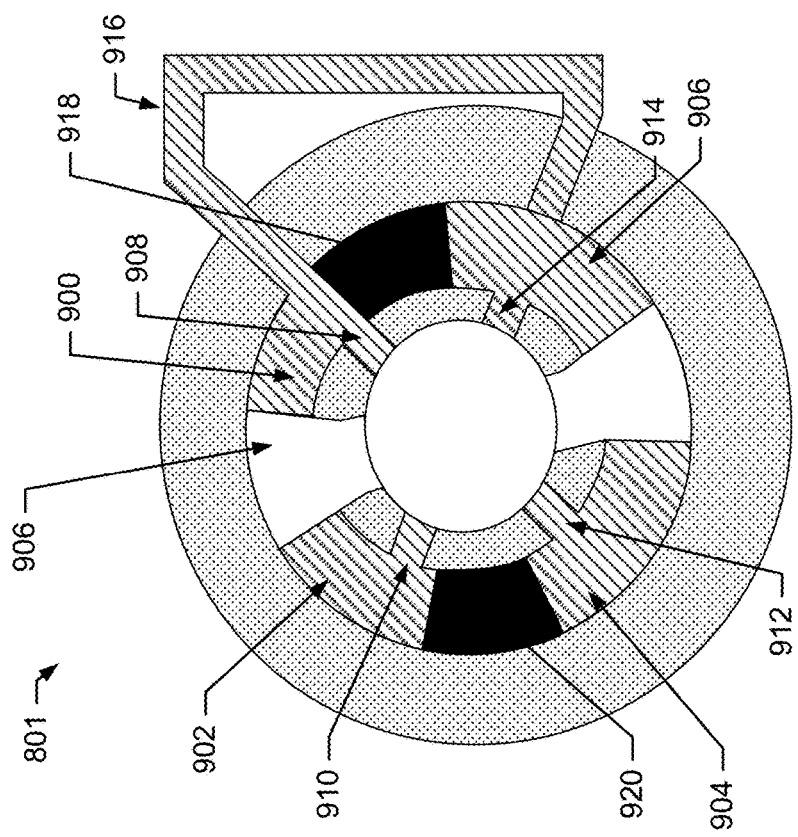
FIG. 10
FIG. 11
FIG. 9

ELECTRO-HYDRAULIC SERVO-VALVES AND RELATED METHODS

RELATED APPLICATION

This patent claims the benefit under 35 U.S.C. § 119(e) to U.S. Patent Provisional Application No. 63/146,977, filed on Feb. 8, 2021. U.S. Patent Provisional Application No. 63/146,977 is hereby incorporated by reference in its entirety. Priority to U.S. Patent Provisional Application No. 63/146,977 is hereby claimed.

FIELD OF THE DISCLOSURE

This disclosure relates generally to flight control systems, and, more particularly, to electro-hydraulic servo-valves and related methods.

BACKGROUND

An air vehicle such as a fixed-wing plane includes control surfaces (e.g., flaps) that are selectively actuated to affect behavior of the air vehicle during takeoff, flight, and/or landing. Actuation of the control surface can be driven by hydraulic power. An electro-hydraulic servo-valve (EHSV) can be used to modulate a flow of hydraulic fluid to an actuator. The actuator converts the hydraulic fluid into mechanical power to drive the airflow control surface.

SUMMARY

An example electro-hydraulic servo-valve includes an inlet to receive a fluid from a reservoir, a torque motor, a chamber, the fluid to return to the reservoir via the chamber, and a flexure tube coupled to the torque motor. At least a portion of the flexure tube is disposed in the chamber. The flexure tube includes a nozzle to deliver the supply fluid to an actuator. The example electro-hydraulic servo-valve includes a damper operatively coupled to the flexure tube. The damper is disposed in the chamber.

An example system disclosed herein includes an electro-hydraulic servo-valve. The electro-hydraulic servo-valve includes a first damper, a second damper, and a coupler disposed between the first damper and the second damper. The example system includes a processor to generate an instruction to activate the coupler to operatively couple the first damper and the second damper to provide for damping at the electro-hydraulic servo-valve via the first damper and the second damper.

An example apparatus includes a first damper including a driving member and a driven member. The driven member is to pivot in response to movement of the driving member. The example apparatus includes a second damper including a shaft and a vane. The vane is to control movement of a fluid in response to rotation of the shaft. The example apparatus includes a coupler to operatively couple the first damper and the second damper via the driven member and the shaft.

BRIEF DESCRIPTION OF THE DRAWINGS

FIG. 9 is a cross-sectional view of the damping system of FIGS. 6-8 taken along the E-E line of FIG. 8.

FIGS. 10 and 11 illustrate movement of a vane of the example damping system of FIGS. 6-9.

Figure 1:
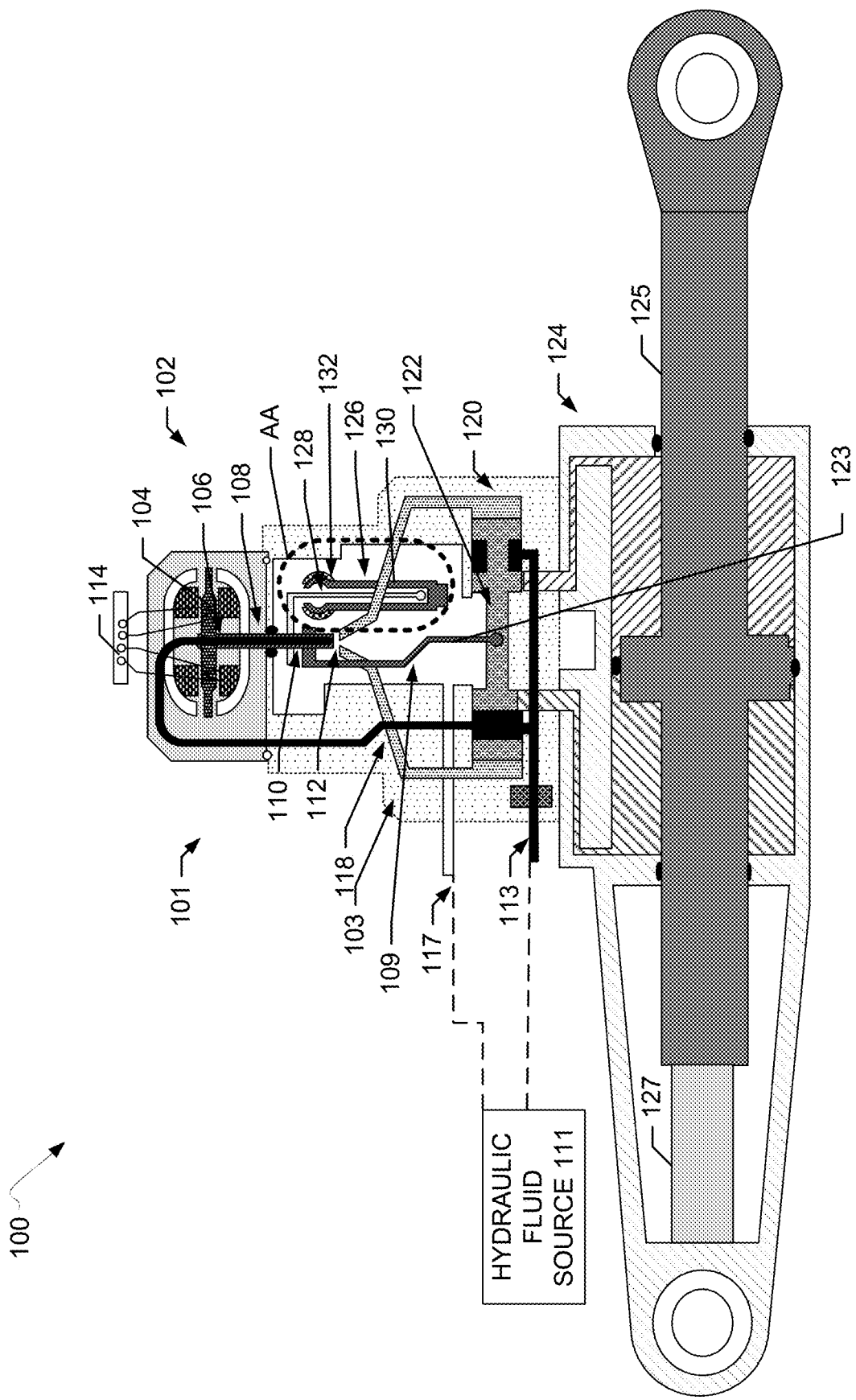
FIG. 1 illustrates a first example electro-hydraulic system including a jet pipe electro-hydraulic servo-valve including a damper in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

An air vehicle such as a fixed-wing plane includes control surfaces (e.g., flaps) that are selectively actuated to affect behavior of the air vehicle during takeoff, flight, and/or landing. Actuation of the control surface can be driven by hydraulic power. An electro-hydraulic servo-valve (EHSV) can be used to modulate a flow of hydraulic fluid to an actuator. The actuator converts the hydraulic fluid into mechanical power to drive the airflow control surface.

A known two-stage EHSV includes a flexure tube to carry hydraulic fluid received at the EHSV via an input port, where the input port is fluidly coupled to a hydraulic system. The flexure tube moves via an armature in response to current supplied to a torque motor from an electrical input to direct the fluid to a first fluid channel or a second fluid channel via a nozzle of the flexure tube.

In the known EHSV, inertia of the armature interacting with the flexure tube can result in resonance or oscillation of the flexure tube including the nozzle. As a result of the oscillations, the alignment of the nozzle with the respective first and second fluid channels can be affected and, thus, the accuracy with which the nozzle delivers fluid to the first and second fluid channels can be compromised. As a result, the position of a spool of the EHSV is dynamically unstable, which affects the performance of the actuator of an electro-hydraulic system that includes the EHSV.

Further, in some known aircraft and/or launch vehicles, available space for storing the hydraulic system in the vehicle is limited, particularly for air vehicles including wings having a thin profile and/or constructed from composite materials. As a result, a reservoir of the hydraulic system has a small volume and/or a cooling system for the hydraulic system is limited in size and, thus, the cooling capacity that can be provided for the fluid is limited. As a result, the temperature of the hydraulic fluid can reach, for instance, 225° F. When the temperature of the hydraulic fluid delivered to the known EHSV increases, the viscosity of the hydraulic fluid decreases. Changes in the viscosity of the fluid can cause the flexure tube and the nozzle of the EHSV to become dynamically unstable, which can result in the occurrence of limit cycle oscillations (LCO). LCO can cause bending of the flexure tube and may result in premature failure of the tube. LCO introduces dynamic instabilities in the EHSV between the nozzle and the spool. Further, LCO propagates to the actuator, and the control surface(s) controlled by the actuator. Such oscillations can result in vibration of the aircraft and compromise flight performance and/or disturb individuals on the aircraft.

Known efforts to reduce LCO at the EHSV include either increasing a stiffness of a housing in which the EHSV is disposed. However, this approach can cause a weight of the housing to increase to maintain the same or substantially the same coupling mechanism or geometry between the EHSV and the actuator while increasing stiffness of the housing. In some instances, a mounting geometry of the EHSV may need to be changed to accommodate a larger housing of the EHSV. Other known efforts include using multiple EHSVs, where each EHSV operates with a reduced flow rate. However, this approach also increases the weight of the aircraft.

Disclosed herein are example systems and methods that provide for damping of oscillations of a flexure tube of an EHSV to reduce or substantially eliminate the occurrence of LCO at the EHSV. Example EHSVs disclosed herein include a damper to generate damping forces to counter the oscillations at the nozzle. Example dampers disclosed herein include a driving member that moves in response to movement of the flexure tube. Movement of the driving member of the damper causes corresponding movement of a driven member of the damper to generate damping forces. As a result, example dampers disclosed herein prevent the propagation of limit cycle oscillations throughout an electro-hydraulic system including the EHSV and an actuator, thereby resulting in a more stable system for controlling a control surface of an aircraft. As a result of the substantial reduction and/or elimination of LCO, examples disclosed herein substantially reduce or eliminate inconsistencies in alignment between the flexure tube nozzle and the spool and increase the accuracy with which the nozzles delivers fluid to the fluid channels associated with the spool.

Example dampers disclosed herein provide damping for EHSVs exposed to varying fluid flow rates (e.g., between 30 and 35 gallons per minute (GPM), above 35 GPM) and/or fluid temperatures. Some example dampers disclosed herein provide for additional damping to augment the damping provided by the driving member and driven member. In such example dampers, a vane may be selectively driven to rotate to control movement of fluid in the damper to increase the damping forces generated. Examples disclosed herein provide for efficient damping of the EHSV while minimizing increases to the weight of the EHSV and, thus, the aircraft. Examples disclosed also enable a mounting geometry of an electro-hydraulic servo-valve to be maintained (e.g., a standard mounting geometry as specified in Standard ARP490 provided by SAE International®) while providing for damping. Further, because of the reduction and/or elimination of damping at the electro-hydraulic system, a rate of fluid flow provided to the actuator via the EHSV can be increased without causing LCO. As such, examples disclosed herein can deliver a higher fluid flow than a standard size EHSV (e.g., a size IV electro-hydraulic servo-valve of Standard ARP490). Thus, examples disclosed herein efficiently enable a EHSV to meet flow rate demands of the actuator of the electro-hydraulic system without LCO.

Although examples disclosed herein are discussed with respect to a damper operatively coupled to a flexure tube of a jet pipe electro-hydraulic servo-valve, example dampers disclosed herein can be used with other types electro-hydraulic servo-valves, such as a flapper-nozzle electro-hydraulic servo-valve is similar.

FIG. 1 illustrates an example electro-hydraulic system 100 including a two-stage electro-hydraulic servo-valve (EHSV) 101 and an actuator 124 in accordance with teachings of this disclosure. The example EHSV 101 includes a housing 103 and a torque motor 102 having an armature 104. A first end 106 of a flexure tube 108 is coupled to the armature 104. A second end 110 of the flexure tube 108 includes a nozzle 112. Hydraulic fluid (e.g., supply fluid) enters the EHSV 101 from a hydraulic fluid source or reservoir 111 via an inlet port 113 (supply pressure) of the EHSV 101. The fluid flows through the flexure tube 108, which directs the fluid into a chamber 109 via the nozzle 112. A return pressure of the fluid can be measured at an outlet 117. The flexure tube 108 moves via the armature 104 in response to current supplied to the torque motor 102 from an electrical input 114 to cause the nozzle 112 to deliver the fluid to a first fluid channel 118 or a second fluid channel 120. The fluid delivered via the nozzle 112 is used to control a position of a spool/sleeve valve 122 to provide output flow to the actuator 124 at a flow rate demanded by the actuator 124.

In the electro-hydraulic system 100 of FIG. 1, the torque motor 102 serves as a hydraulic amplifier and defines a first stage or a pilot stage of the EHSV 101. The flow of the hydraulic fluid through the first fluid channel 118 or the second fluid channel 120 via the nozzle 112 is used to control movement of the spool 122 in a second stage or a main stage of the EHSV 101. Movement of the spool 122 controls output flow to a hydraulic actuator 124.

The example EHSV 101 of FIG. 1 includes a feedback spring 123 disposed between the flexure tube 108 and the spool 122 to provide feedback regarding the position of the spool 122. For example, a first end of the spring 123 is coupled to the flexure tube 108 (e.g., via an interference fit) and a second end of the spring 123 is coupled to the spool 122 (e.g., disposed in a cavity defined in the spool 122). During movement of the second-stage spool 122, the position of the spool 122 is fed to the first stage of the EHSV 101 via the feedback spring 123. As the spool 122 moves due to the change in pressure generated in response to the hydraulic amplification provided by the torque motor 102, the spool 122 pushes on or drags the second end of the spring 123 (i.e., the end coupled to the spool 122). The force generated by the spool 122 on the spring 123 creates a restoring force on the nozzle 112. In the known EHSV 101, the spool 122 moves until the spool 122 reaches an equilibrium position in which the torque generated by the feedback spring 123 equals the torque generated by the torque motor 102.

Figure 4:
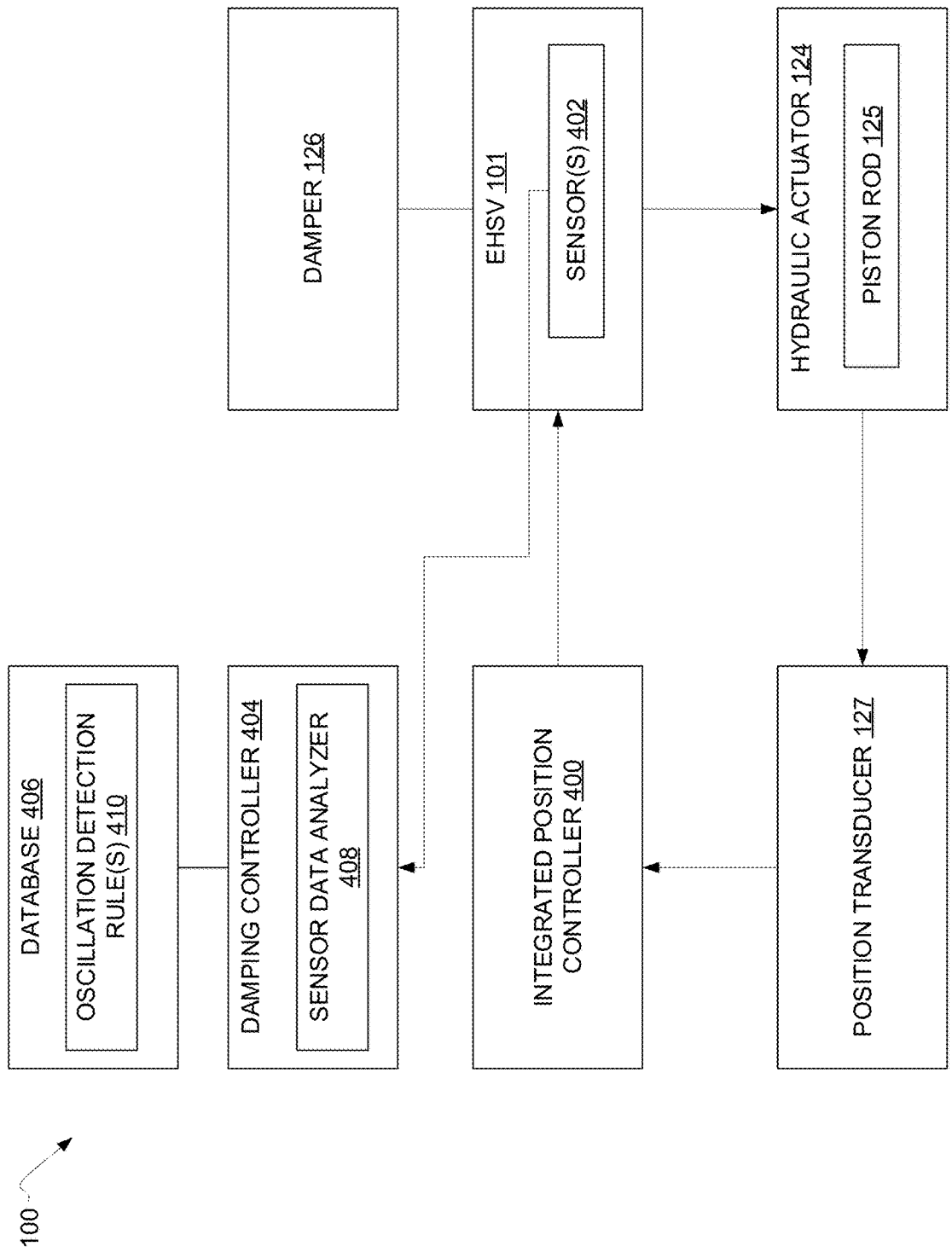
FIG. 4 is a block diagram of the first example electro-hydraulic system of FIG. 1 including an example implementation of a damping controller.

The EHSV 101 response to an electrical input signal to provide the hydraulic fluid to the actuator 124. The actuator 124 of FIG. 1 includes a piston rod 125 and a position transducer 127. The position transducer 127 provides feedback regarding the position of the piston rod 125 to an integrated position controller (FIG. 4). The signal generated by the position transducer 127 is fed to the integrated position controller that is communicatively coupled to the torque motor 102. The controller generates an electrical command signal to drive the torque motor 102. The feedback signal from the position transducer 127 is fed to the controller and compared to the command signal. The controller drives the torque motor 102 until the error between the command signal and the feedback signal is zero or substantially zero. In FIG. 1, the position of the piston rod 125 is proportional to the electrical command signal provided to the torque motor 102.

In some instances, the flexure tube 108 including the nozzle 112 oscillates in response to changes in temperature of the hydraulic fluid received at the EHSV 101, which is caused by changes in fluid viscosity and result in instabilities at the flexure tube 108 and the nozzle 112. To counter oscillations at the flexure tube 108 and/or the nozzle 112 and to prevent those oscillations from propagating to, for example, the spool 122 and/or the actuator 124, the example EHSV 101 of FIG. 1 provides a nozzle damping function via a damper 126 disposed in the chamber 109 and operatively coupled to the flexure tube 108. The damping forces generated by the damper 126 counter oscillations of the flexure tube 108 and, thus, the nozzle 112. As a result, oscillations at the spool 122 and/or the actuator 124 are reduced or substantially eliminated.

The example damper 126 of FIG. 1 includes a driving member 128. The driving member 128 is disposed proximate to the flexure tube 108 of the EHSV 101 such that movement of the flexure tube 108 by the torque motor 102 causes movement of the driving member 128. For example, the flexure tube 108 can include a recess to receive (e.g., movably receive) a portion of the driving member 128 therein. The example damper 126 of FIG. 1 includes a driven member 130 surrounding at least a portion of the driving member 128 and coupled to a pivot 132.

Figure 2:
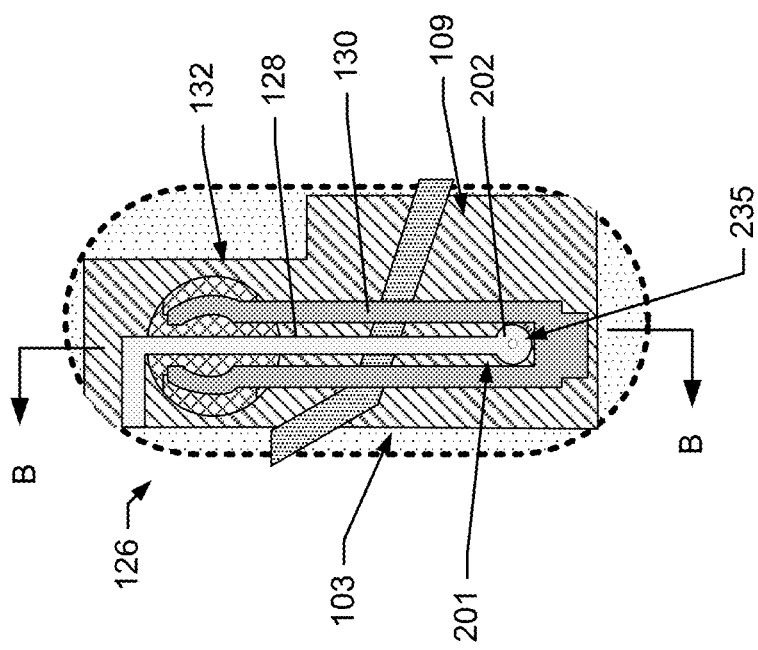
FIG. 2 shows the damper of FIG. 1 taken from view AA in FIG. 1.

FIG. 2 shows the example damper 126 of FIG. 1 taken from view AA in FIG. 1. As shown in FIG. 2, an end 201 of the driving member 128 is coupled to a ball 202, which provides for an operative coupling (e.g., serves as a point contact) between the driving member 128 and the driven member 130. A rotational axis 235 (where axis 235 extends in a direction in and out of the page) is located at the center of the ball 202 and intersects a centerline of the driving member 128. The driving member 128 moves in response to movement of the flexure tube 108, which causes the driven member 130 to move around pivot 132. Thus, the driving member 128 actuates the driven member 130. Movement of the driven member 130 causes movement of the hydraulic fluid in the chamber 109 (e.g., a driven medium) and, thus, counters or dampens oscillations of the flexure tube 108 and the nozzle 112. In the example of FIG. 2, the ball 202 has a substantially spherical or cylindrical shape, however, other shapes, sizes, and/or devices for facilitating movement of the driven member 130 could be used.

Figure 3:
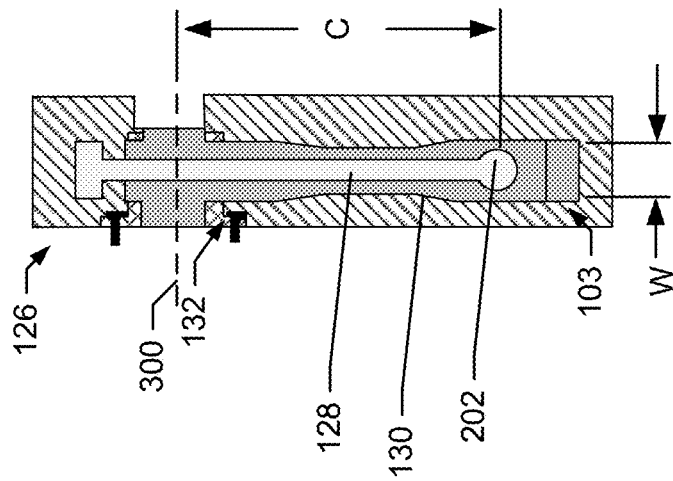
FIG. 3 is a cross-sectional view of the damper of FIGS. 1 and 2 taken along the B-B line of FIG. 2.

FIG. 3 is a cross-sectional view of the example damper 126 of FIGS. 1 and 2 taken along the B-B line of FIG. 2. In the example damper 126 of FIGS. 1-3, a length C of the driving member 128 extending between the pivot point of the pivot 132 (as represented by the dashed line 300) and rotational axis 235 (FIG. 2) of the ball 202 can be selected to increase or decrease an amount of damping provided by the damper 126. In this example, increasing the length C of the driving member 128 increases the amount of damping provided by the damper 126. In some examples, the length C of the driving member 128 ranges from 0.5 inches to 2.0 inches. The length C of the driving member 128 can have other values than the example values disclosed herein. Additionally or alternatively, in the example of FIGS. 1-3, a width W of the driven member 130 can be selected to control the amount of damping provided by the damper 126. In some examples, the width W of the driven member 130 ranges from 0.25 inches to 0.5 inches. The width W of the driven member 130 can have other values than the example values disclosed herein.

FIG. 4 is a block diagram of the example electro-hydraulic system 100 of FIG. 1. As shown in FIG. 4, an integrated position controller 400 is in communication with the EHSV 101. The integrated position controller 400 transmits a command signal to the EHSV 101 to drive the torque motor 102 (FIG. 1) of the EHSV 101. During operation of the electro-hydraulic system 100, a position of the piston rod 125 of the actuator 124 is measured by the position transducer 127. Signal data generated by the position transducer 127 is fed back to the integrated position controller 400. The integrated position controller 400 adjusts the signal provided to the EHSV 101 in response to the feedback signal from the position transducer 127.

During operation of the EHSV 101, the damper 126 including the driving member 128 and the driven member 130 reduces oscillations of the flexure tube 108 as disclosed in connection with FIGS. 1-3. In some examples, the EHSV 101 includes sensor(s) 402 to monitor vibrations at the EHSV 101 during operation of the EHSV 101. The sensor(s) 402 can include vibration sensor(s)) disposed at one or more locations in the EHSV 101 of FIG. 1. The sensor(s) 402 can be disposed at, for example, the flexure tube 108, the nozzle 112, the torque motor 102, etc. Additionally or alternatively, the sensor(s) 402 can be located at the actuator 124 to detect oscillations at the actuator 124. The sensor data generated by the sensor(s) 402 is transmitted via wired and/or wireless communication protocol(s) to a damping controller 404. In the example of FIG. 4, the damping controller 404 is implemented by one or more processor(s) and/or cloud-based device(s) (e.g., server(s), processor(s), and/or virtual machine(s)).

The sensor data generated by the sensor(s) 402 are stored in a database 406. In some examples, the damping controller 404 includes the database 406. In other examples, the database 406 is located external to the damping controller 404 in a location accessible to the damping controller 404, as shown in FIG. 4.

The example damping controller 404 includes a sensor data analyzer 408. The sensor data analyzer 408 analyzes the data generated by the sensor(s) 402 to detect oscillations at the EHSV 101. The sensor data analyzer 408 can detect the presence of oscillations and/or determine the amount of oscillations by comparing the sensor data to oscillation detection rule(s) 410 stored in the database 406 (e.g., user-defined oscillation threshold(s)). The sensor data analyzer 408 can output data regarding the detected oscillations, for example, for presentation to a user. As disclosed herein, the amount of oscillations at the EHSV 101 can be used to select design parameters for the damper 126.

While an example manner of implementing the damping controller 404 is illustrated in FIG. 4, one or more of the elements, processes and/or devices illustrated in FIG. 4 may be combined, divided, re-arranged, omitted, eliminated and/or implemented in any other way. Further, the example database 406, the example sensor data analyzer 408, and/or, more generally, the example damping controller 404 of FIG. 4 may be implemented by hardware, software, firmware and/or any combination of hardware, software and/or firmware. Thus, for example, any of the example database 406, the example sensor data analyzer 408, and/or, more generally, the example damping controller 404 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 406 and/or the example sensor data analyzer 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example damping controller 404 of FIG. 4 may include one or more elements, processes and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
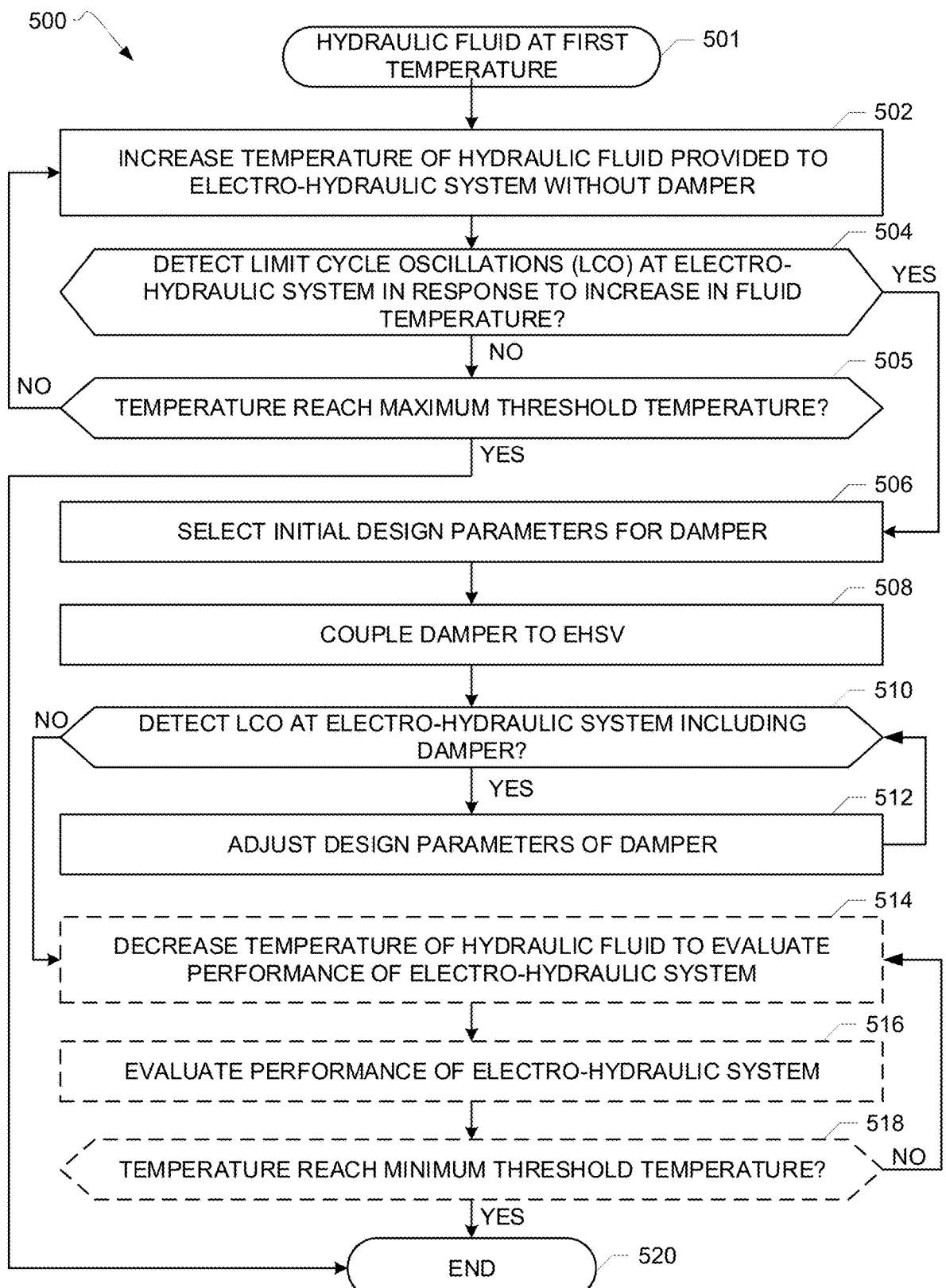
FIG. 5 is a flowchart of an example method for selecting design parameters for the damper of FIGS. 1-3.

FIG. 5 is a flowchart of an example method 500 for selecting design parameters of a damper for use with an electro-hydraulic servo-valve (EHSV) of an electro-hydraulic system that also includes a hydraulic actuator. The example method 500 of FIG. 5 can be used to select a length C of the driving member 128 of the example damper 126 of FIGS. 1-3, and/or a width W of the driven member 130 of the damper 126.

In the example of FIG. 5, hydraulic fluid provided to an electro-hydraulic system (e.g., the electro-hydraulic system 100 of FIG. 1) has a first temperature at a first time (block 501). The first temperature can be, for instance, 60° F. The example method 500 includes increasing a temperature of the hydraulic fluid provided to the electro-hydraulic system, where the electro-hydraulic system does not include a damper (block 502). In some examples, the temperature is increased in intervals of, for instance, 20° F. For example, a temperature of hydraulic fluid flowing through the EHSV 101 of the example electro-hydraulic system 100 of FIG. 1 can be increased at the hydraulic fluid source 111 prior to being received at the EHSV 101. The temperature of the fluid can be increased from 60° F. to 275° F. in 20° F. intervals.

The example method 500 includes determining whether limit cycle oscillations (LCO) are detected at the electro-hydraulic system in response to the increase in fluid temperature (block 504). Increased fluid temperature causes a decrease in fluid viscosity and can result instabilities at, for instance, a flexure tube and/or nozzle of the EHSV. Oscillations of the flexure tube 108 and/or the nozzle 112 of the EHSV 101 of FIG. 1 can be measured by the sensor(s) 402 (e.g., vibration sensor(s)) during operation of the EHSV 101. Additionally or alternatively, the sensor(s) 402 can measure oscillations at the actuator 124. The signal data generated by the sensor(s) 402 is analyzed by the sensor data analyzer 408 of the example damping controller 404 of FIG. 4 to determine the amount of oscillations. The sensor data analyzer 408 can compare the sensor data to predefined oscillation threshold(s) 410 to determine if the oscillations exceed the threshold(s).

If LCO are not detected at block 504, the example method 500 continues to increase the temperature of the hydraulic fluid until the temperature reaches a maximum threshold temperature (block 505). The maximum threshold temperature can be user defined. For instance, the maximum threshold temperature can be 275° F. If the maximum temperature threshold has been reached and no LCO are detected at the electro-hydraulic system, then the example method 500 ends (block 520). In such instances, no damping may be needed at the electro-hydraulic system.

If LCO are detected at block 504, the example method 500 of FIG. 5 includes selecting initial design parameters of a damper to reduce oscillations at the electro-hydraulic system (block 506). In some examples, the initial design parameters for the damper are selected based on an amount of oscillations at the EHSV and/or actuator. For example, a length for the driving member 128 of the damper 126 of FIGS. 1-3 can be between 0.5 inches to 2.0 inches, where an increased length provides for increased damping forces. A width of the driven member 130 of the damper 126 can be, for example, between 0.25 inches to 0.5 inches, where an increased width provides for increased damping forces.

The example method 500 includes coupling the damper to the EHSV (block 508). For example, the damper 126 can be coupled to the EHSV 101 of FIG. 1 such that motion of the flexure tube 108 is transferred to the driving member 128 of the damper 126. In some examples, the driving member 128 is coupled to the flexure tube 108 using an intermediary or feedback device such as a spring similar to the feedback spring 123 of FIG. 1 that couples the spool 122 to the flexure tube 108. Alternately, a portion of the driving member 128 can be disposed in a notch or groove formed in the flexure tube 108 to enable motion of the flexure tube 108 to be transferred to the driving member 128.

The example method 500 of FIG. 5 includes determining if limit cycle oscillations are detected at the electro-hydraulic system including the damper (block 510). For example, the sensor data analyzer 408 of the damping controller 404 of FIG. 4 can compare data generated by the vibration sensor(s) 402 during operation of the EHSV 101 including the damper 126 of FIG. 1 to the sensor data generated prior to the addition of the damper 126.

In the example of FIG. 5, if there are continued oscillations at the electro-hydraulic system despite the inclusion of the damper at the EHSV, then the example method 500 includes adjusting the design parameters of the damper to provide for increased damping forces (block 512). For example, the length C of the driving member 128 of the damper 126 can be increased. Additionally or alternatively, a width W of the driven member 130 may be increased.

In some examples, the method 500 of FIG. 5 includes characterizing a performance of the electro-hydraulic system in view of the addition of the damper to the EHSV. For example, when oscillations detected at the electro-hydraulic system are below a threshold and/or substantially eliminated (block 510), the example method 500 includes decreasing a temperature of the hydraulic fluid provided to the EHSV to evaluate performance of the hydraulic actuator in view of the addition of the damper (block 514). The fluid temperature can be decreased in intervals of, for instance, 20° F. For example, a temperature of the hydraulic fluid provided to the EHSV 101 of FIG. 1 can be decreased to have a temperature range from 60° F. to −65° F. In some examples, the fluid temperature is decreased from, for instance, 60° F. to −65° F. in intervals of 20° F. Decreasing the temperature of the fluid increases a viscosity of the fluid.

The example method 500 includes evaluating the performance of the electro-hydraulic system (block 516). For example, performance metrics such as a rate at which the actuator 124 is loaded can be evaluated. A loaded rate of an actuator for fluid at low temperatures is expected to be less than the loaded rate at high fluid temperatures due to the increased viscosity of the fluid at lower temperatures. The performance of the actuator 124 can be characterized in view of changes to fluid temperature and with reduced or substantially eliminated limit cycle oscillations at the actuator 124 due to the damper 126. The evaluation of the electro-hydraulic system continues until the fluid temperature is decrease to a minimum threshold temperature (block 518). The minimum threshold temperature can be user defined. For instance, the minimum threshold temperature can be −65° F. If the fluid temperature has been decreased to the minimum threshold temperature, the method 500 of FIG. 5 ends (block 520).

As disclosed above, the example damper 126 of FIGS. 1-3 can counter or prevent oscillations of the nozzle 112 that arise due to changes in the fluid temperature and corresponding changes in fluid viscosity. In some examples, the damper 126 of FIGS. 1-3 is used to provide damping at an EHSV when the flow rate of hydraulic fluid at the EHSV is between 30 and 35 gallons per minute (GPM). In some other examples, additional damping at the EHSV is provided when, for instance, flow rates through the EHSV are above 35 GPM.

Figure 6:
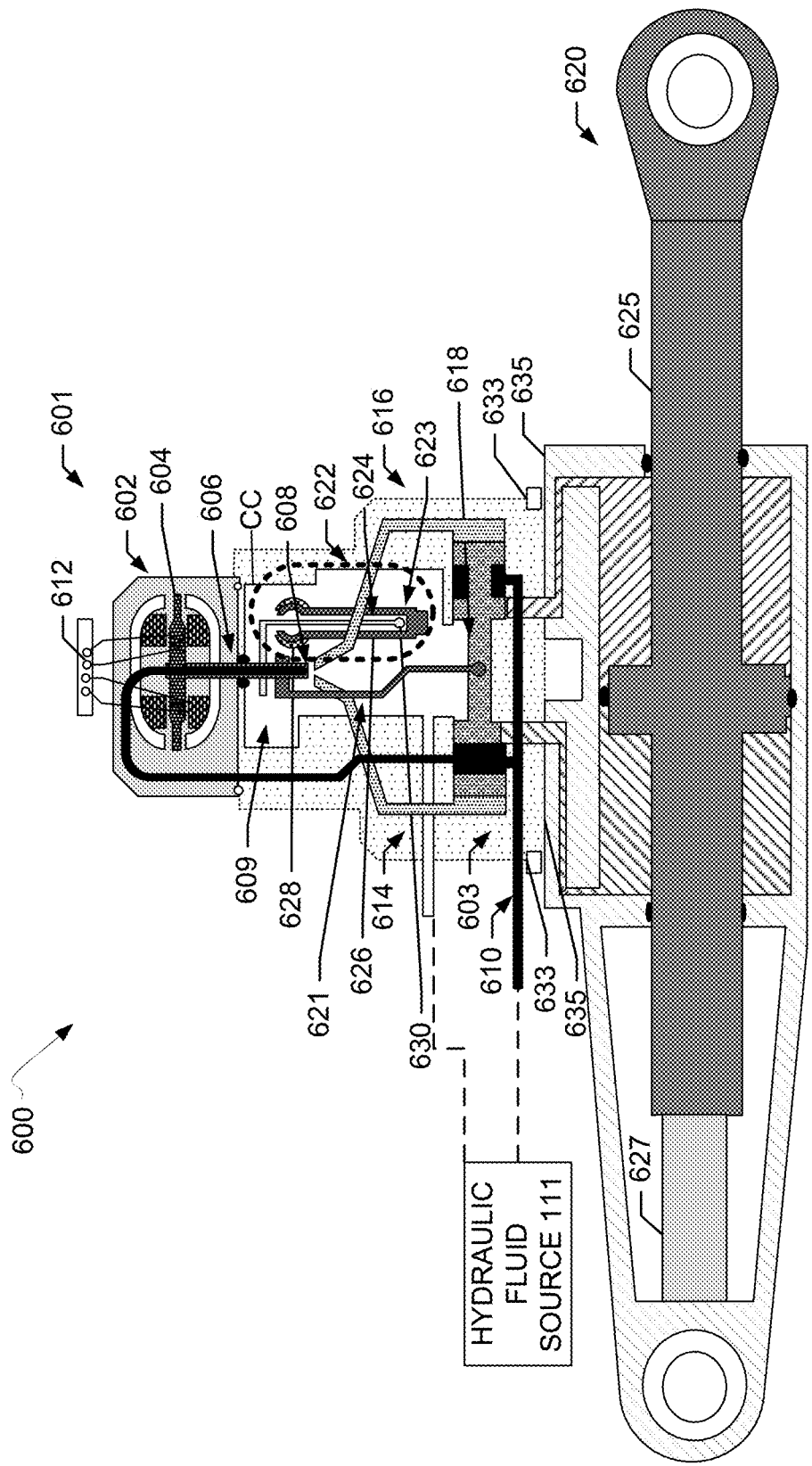
FIG. 6 illustrates a second example electro-hydraulic system including a damping system in accordance with teachings of this disclosure.

FIG. 6 illustrates an example electro-hydraulic system 600 including a two-stage electro-hydraulic servo-valve (EHSV) 601 and a hydraulic actuator 620 in accordance with teachings of this disclosure. The example EHSV 601 is substantially the same as the EHSV 101 of FIG. 1. For instance, the EHSV 601 of FIG. 6 includes a housing 603, a torque motor 602 having an armature 604, a flexure tube 606 coupled to the armature 604 and including a nozzle 608, an inlet port 610 to receive hydraulic fluid from the hydraulic fluid source 111, and an electrical input 612 to supply current to the torque motor 602. The nozzle 608 emits fluid into a chamber 609 of the EHSV 601. As disclosed herein, the flexure tube 606 moves via the armature 604 in response to the current supplied to the torque motor 602 to cause the nozzle 608 to direct the fluid to a first fluid channel 614 or a second fluid channel 616. The fluid delivered via the nozzle 608 is used to control a position of a spool valve 618 to provide output flow to the actuator 620. The example EHSV 601 of FIG. 6 includes a feedback spring 621 disposed between the flexure tube 606 and the spool 618 to provide feedback regarding the position of the spool 618. The actuator 620 of FIG. 6 includes a piston rod 625 and a position transducer 627 to provide feedback regarding the position of the piston rod 625 to an integrated position controller (FIG. 13).

The example EHSV 601 of FIG. 6 includes a damping system 622. The damping system 622 of FIG. 6 includes a first damper 623 including a driving member 624 and a driven member 626 substantially as disclosed in connection with the example damper 126 of FIGS. 1-3. The driving member 624 moves in response to movement of the flexure tube 606, which causes a ball 630 and the driving member 624 to oscillate about a pivot 628. Oscillation of the ball 630 and the driving member 624 drives movement of the driven member 626 about the pivot 628 as disclosed in connection with the damper 126 of FIGS. 1-3. The relative movement of the driving member 624 and the driven member 626 inside a fluid medium counters or dampens oscillation of the flexure tube 606 and, thus, the nozzle 608. In the example of FIG. 6, the ball 630 has a substantially spherical or cylindrical shape, however, other shapes, sizes, and/or devices for facilitating movement of the driven member 626 could be used.

In some examples, the damping provided by the driving member 624 and the driven member 626 of the first damper 623 of the damping system 622 reduces or substantially eliminates oscillations in the example electro-hydraulic system 600 of FIG. 6. For example, the first damper 623 can substantially reduce oscillations at the EHSV 601 for fluid flow rates between 30-35 GPM. In some examples, fluid flow rates may be greater (e.g., over 35 GPM).

The example damping system 622 of FIG. 6 includes a second damping system to augment the damping forces provided by the first damper 623. As disclosed herein, the second damping system can be implemented when, for example, flow rates of the hydraulic fluid at the EHSV 601 are above a flow rate threshold (e.g., above 35 GPM) and/or when temperature of the fluid is above a temperature threshold. Changes in flow rates and/or fluid temperature can increase instability at the flexure tube 606 and/or nozzle 608 due to changes in properties of the fluid flowing therein (e.g., changes in viscosity).

In some examples, the electro-hydraulic system 600 includes accelerometer(s) 633 disposed proximate to one or more structural interfaces 635 between the actuator 620 and a body of the EHSV 601 (e.g., surfaces at which the actuator 620 is coupled to the EHSV 601). The accelerometer(s) 633 measure accelerations of the actuator 124 and/or the EHSV 601 (e.g., displacement between the actuator 124 and the EHSV 601) during LCO. As disclosed herein, the acceleration data from the accelerometer(s) 633 can represent resonant frequency and mode shape during LCO. The acceleration data can be used to tune the damper design (e.g., in a laboratory setting). The accelerometer(s) 633 can be disposed at different locations than shown in FIG. 6 (e.g., at the actuator 620).

Figure 7:
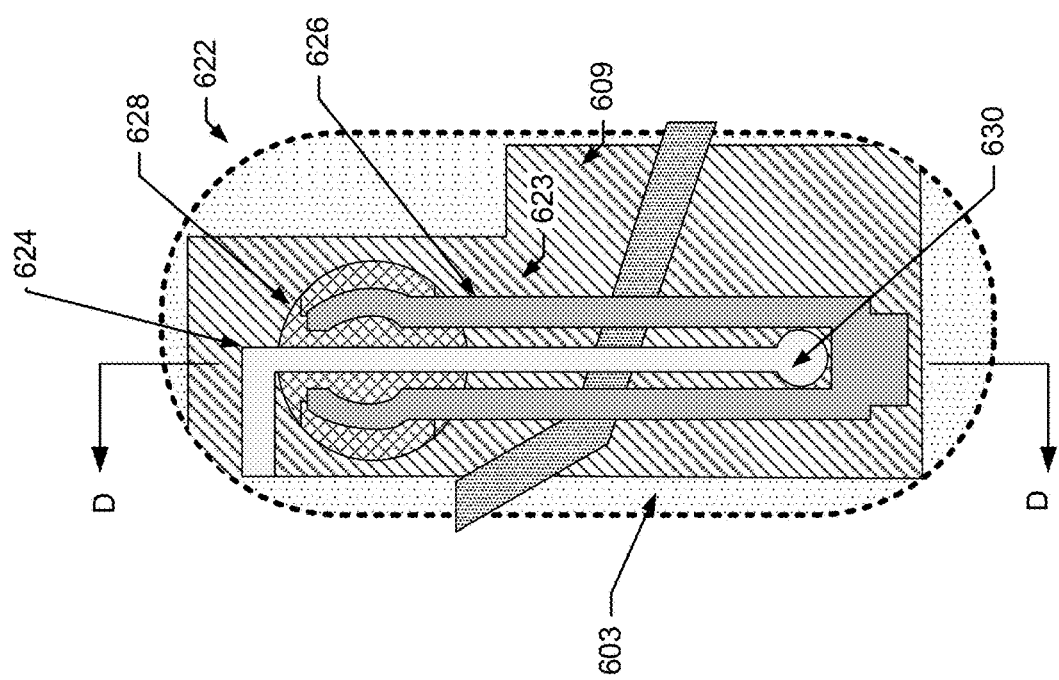
FIG. 7 illustrates the damping system of FIG. 6 taken from view CC in view FIG. 6.

FIG. 7 shows the example damping system 622 of FIG. 6 taken from the CC view of FIG. 6 and, in particular, shows the first damper 623 of the damping system 622. As shown in FIG. 7, the driven member 626 surrounds at least a portion of the driving member 624. Movement of the driving member 624 in response to movement of the flexure tube 606 (FIG. 6) causes movement of the hydraulic fluid in the chamber 609 (e.g., a driven medium for the first damper 623) and the driven member 626 as disclosed in connection with the example damper 126 of FIGS. 1-3. The length of the driving member 624 and/or a width of the driven member 626 can be selected to control the amount of damping provided by the damper 624 as disclosed herein.

Figure 8:
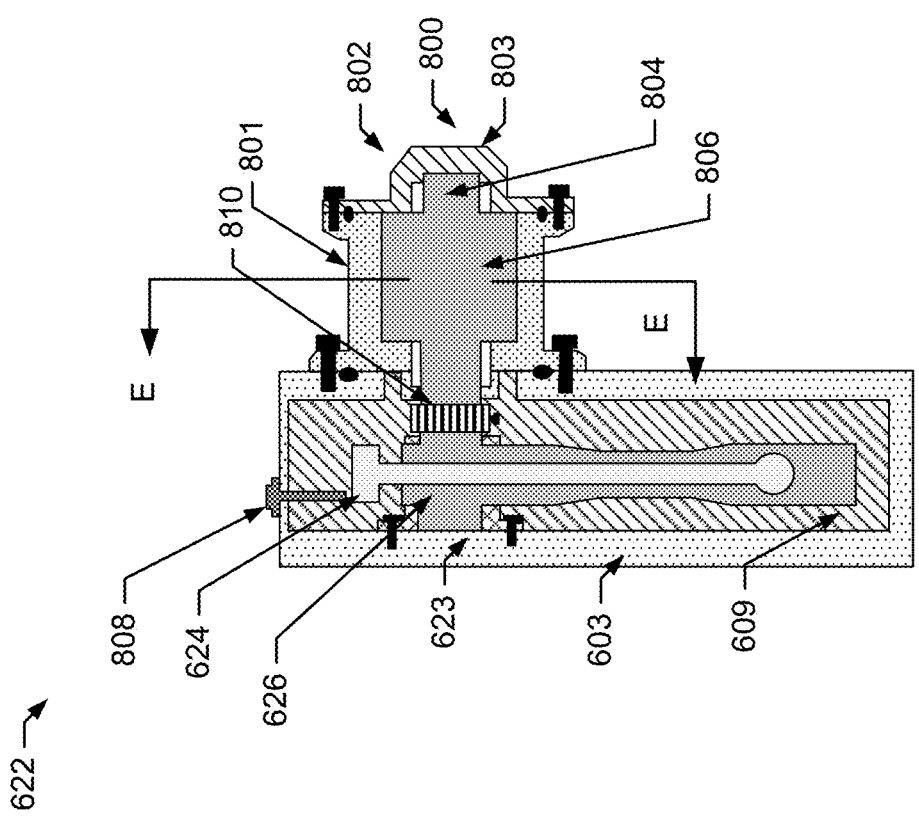
FIG. 8 is a cross-sectional view of the damping system of FIGS. 6 and 7 taken along the D-D line of FIG. 7.

FIG. 8 is a cross-sectional view of the example damping system 622 of FIGS. 6 and 7 taken along the D-D line of FIG. 7. FIG. 8 shows the first damper 623 and a second damper 800 of the damping system 622. The second damper 800 of the damping system 622 includes a housing 802. The housing 802 includes a first portion 801 (e.g., a cylindrical portion) and an end plate 803 coupled to the first portion 801 to support a vane shaft 804 disposed therein. The vane shaft 804 includes a vane 806 rotatably coupled to thereto. As disclosed herein, rotation of the vane 806 controls movement of hydraulic fluid in the first portion 801 of the housing 802 and transfer of the fluid between chambers defined in the first portion 801 (FIG. 9). As disclosed herein, the movement of the fluid thru the orifices separating the chambers results in pressure changes of the fluid, which affects (e.g., increases) the damping provided by the damping system 622. The fluid in the first portion 801 of the housing 802 can be the same fluid as the supply fluid received at the EHSV 601 or a different fluid. In examples in which the fluid is a different fluid, the electro-hydraulic system can include a second reservoir to provide fluid to first portion 801 of the housing 802 of the second damper 800.

The example damping system 622 of FIGS. 6-8 includes a coupler 810. The coupler 810 provides a mechanical and/or electro-mechanical coupling between the first damper 623 and the second damper 800 of the damping system 622. In particular, the driven member 626 of the first damper 623 and the vane shaft 804 of the second damper 800 are coupled by the coupler 810 such that, when activated, the coupler 810 transfers torque from the driven member 626 to the vane shaft 804. As a result, the vane shaft 804 and, thus, the vane 806 coupled thereto, rotate. In some examples, the coupler 810 can include an electromagnetic clutch. The example damping system 622 can include other mechanical and/or electrical means for coupling the first and second dampers 623, 800.

The coupler 810 is selectively activated to enable the second damper 800 to provide additional damping to supplement (e.g., increasing) the damping provided by the first damper 623. In some examples, the coupler 810 is activated to enable the EHSV 601 to meet a fluid flow output rate demanded by the actuator 620 without LCO. In the example of FIG. 8, the second damper 800 of the damping system 622 provides for additional damping forces based on properties of the supply hydraulic fluid received at the EHSV 601. The EHSV 601 includes sensor(s) 808 disposed in the chamber 609 to measure properties of the hydraulic fluid disposed therein. The sensor(s) 808 can include, for instance, temperature sensor(s) (e.g., a thermocouple(s)) to measure temperature of the hydraulic fluid and/or viscometer(s) to measure fluid viscosity. As mentioned above, the EHSV 601 can include additional and/or different sensors such as the accelerometer sensor(s) 402, 633. As disclosed herein (FIG. 12), the sensor data generated by the sensor(s) 402, 808, 633 are selectively used to determine if additional damping should be provided at the EHSV 601 and, thus, if the coupler 810 (e.g., an electromagnetic clutch) should be activated to enable the second damper 800 to provide the additional damping forces.

FIG. 9 is a cross-sectional view of the example housing 802 of the second damper 800 of the damping system 622 of FIGS. 6-8 taken along the E-E line of FIG. 8. As shown in FIG. 9, the first portion 801 of the housing 802 includes a first chamber 900, a second chamber 902, a third chamber 904, and a fourth chamber 906. The first chamber 900 includes a first orifice 908 for the entry and removal of hydraulic fluid from the first chamber 900 when the vane shaft 804 (FIG. 8) rotates clockwise. Similarly, the second chamber 902 includes a second orifice 910, the third chamber 904 includes a third orifice 912, and the fourth chamber 906 includes a fourth orifice 914. The orifices 908, 910, 912, 914 are fluidly coupled to a fluid conduit 916 that facilitates the flow of fluid between the chambers 900, 902, 904, 906. A size of respective diameters of the orifices 908, 910, 912, 914 can range from, but is not limited to, 0.005 inches to 0.15 inches.

In the example of FIG. 9, activation of the coupler 810 (FIG. 8) drives rotation of the vane shaft 804 and, thus, the vane 806 coupled thereto. The example housing 802 includes a first stop 918 and a second stop 920 to define limits of the rotational movement of the vane 806 about the vane shaft 804.

FIGS. 10 and 11 show rotation of the vane 806 and the corresponding movement of fluid between the chambers 900, 902, 904, 906. As shown in FIG. 10, when the vane shaft 804 and, thus the vane 806, rotate in a clockwise direction, fluid from the first chamber 900 and the third chamber 904 flows into the second chamber 902 and the fourth chamber 906 via the fluid conduit 916, as represented by arrows 1000, 1002, and 1004. As shown in FIG. 11, when the vane shaft 804 and, thus, the vane 806, rotate in a counterclockwise direction, fluid from the second chamber 902 and the fourth chamber 906 flows into the first chamber 900 and the third chamber 904 via the fluid conduit 916, as represented by the arrows 1100, 1102, 1104.

In the example of FIGS. 9-11, as the fluid moves between the chambers 900, 902, 904, 906 via the orifices 908, 910, 912, 914, a resisting force is generated. In this example, the damping force provided by the second damper 800 is proportional to the square of the fluid flow between the chambers 900, 902, 904, 906. The diameters of the respective orifices 908, 910, 912, 914 can be selected to adjust the damping forces provided by the second damper 800 of the damping system 622. For example, decreasing the respective diameters of the orifices 908, 910, 912, 914 causes an increase in fluid pressure as the fluid moves through the orifices 908, 910, 912, 914 and, thus, increases the damping forces generated by the damping system 622. Thus, in the example of FIGS. 7-10, the damping system 622 provides for increased damping forces to counter oscillations at the electro-hydraulic system 600 when the first and second dampers 623, 800 are operative as compared to when the only first damper 623 is used.

Figure 12:
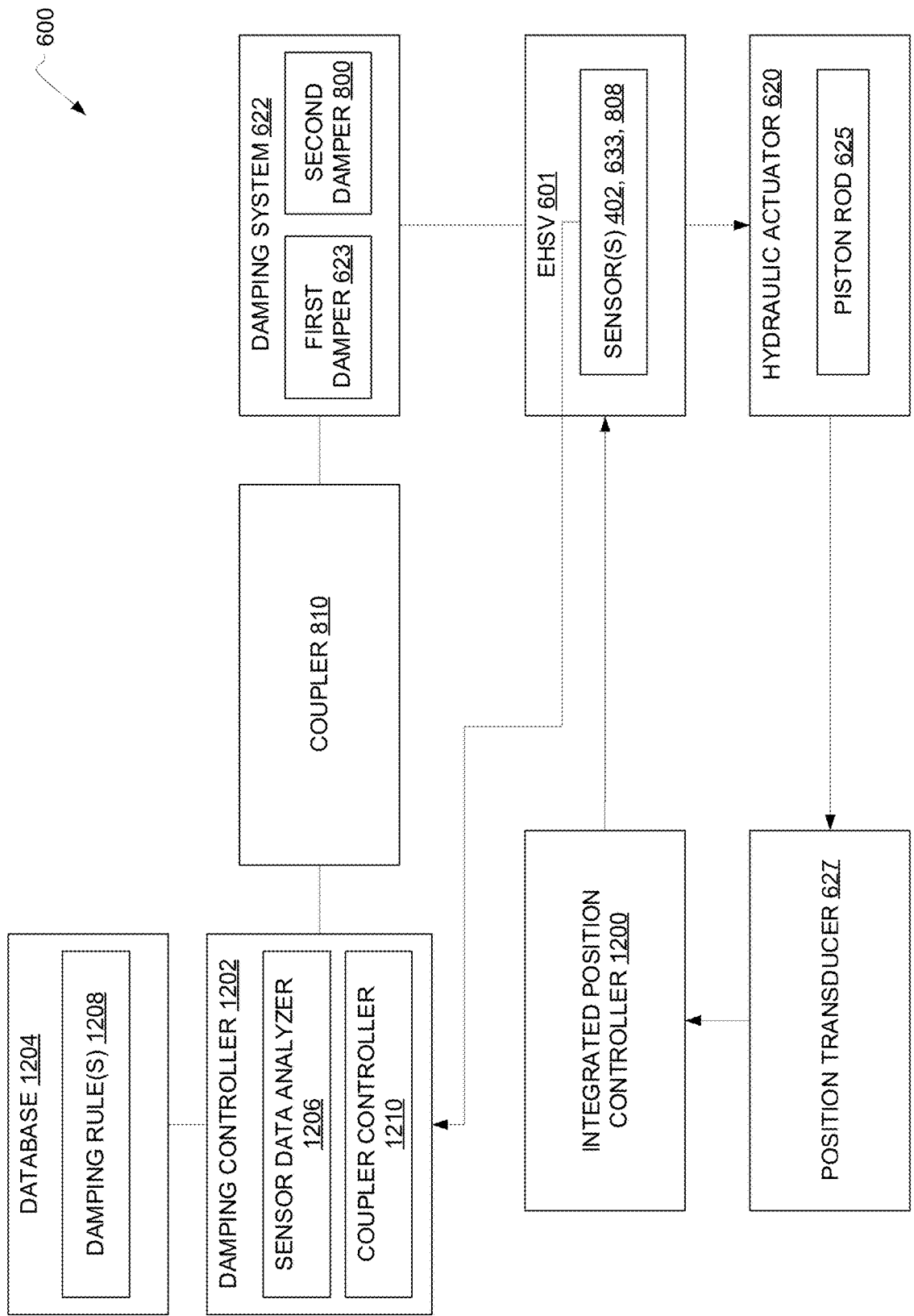
FIG. 12 is a block diagram of the second example electro-hydraulic system of FIG. 6 including another example implementation of a damping controller.

FIG. 12 is a block diagram of the example electro-hydraulic system 600 of FIGS. 6-11. As shown in FIG. 12, an integrated position controller 1200 is in communication with the EHSV 601. The integrated position controller 1200 transmits a command signal to the EHSV 601 to drive the torque motor 602 (FIG. 6) of the EHSV 601. During operation of the hydraulic actuator 620, a position of the piston rod 625 of the actuator 620 is measured by the position transducer 627. Signal data generated by the position transducer 627 is fed back to the integrated position controller 1200. The integrated position controller 1200 adjusts the signal provided to the EHSV 601 in response to the feedback signal from the position transducer 627.

During operation of the EHSV 601, movement of the flexure tube 606 (FIG. 6) is transferred to the damping system 622 to drive movement of the driving member 624 of the first damper 623. The first damper 623 generates damping forces to reduce oscillations at the electro-hydraulic system 600.

Sensor data generated by the sensor(s) 402, 633, 808 of the electro-hydraulic system 600 is transmitted (e.g., via one or more wired or wireless communication protocols) to a damping controller 1202. The damping controller 1202 determines whether additional damping should be provided at the electro-hydraulic system 600 based on the sensor data. For instance, if the damping controller 1202 determines that the temperature of the hydraulic fluid in the chamber 609 (FIG. 6) of the EHSV 601 exceeds a predetermined temperature threshold, the damping controller 1202 determines that additional damping should be provided to counter oscillations at the EHSV 601 resulting from the decrease in fluid viscosity. In the example of FIG. 12, the damping controller 1202 is implemented by one or more processor(s) and/or cloud-based device(s) (e.g., server(s), processor(s), and/or virtual machine(s)).

The sensor data generated by the sensor(s) 402, 633, 808 and transmitted to the damping controller 1202 are stored in a database 1204. In some examples, the damping controller 1202 includes the database 1204. In other examples, the database 1204 is located external to the damping controller 1202 in a location accessible to the damping controller 1202, as shown in FIG. 12.

The example damping controller 1202 includes a sensor data analyzer 1206. The sensor data analyzer 1206 analyzes the data generated by the sensor(s) 402, 633, 808 to determine if additional damping forces should be provided at the EHSV 601 based on, for example, properties of the fluid received at the EHSV 601. The sensor data analyzer 1206 compares the sensor data to damping rule(s) 1208 stored in the database 1204. The damping rule(s) 1208 can include thresholds for fluid temperature and/or fluid viscosity (defined by user inputs) that indicate that additional damping may be warranted. In some examples, the damping rule(s) 1208 define threshold(s) for oscillations at the EHSV 601. In the example of FIG. 12, if the sensor data analyzer 1206 determines that the sensor data exceeds the threshold(s) defined by the damping rule(s) 1208, the sensor data analyzer 1206 determines that additional damping should be provided at the EHSV 601.

The example damping controller 1202 includes a coupler controller 1210. The coupler controller 1210 provides means for controlling operation of the coupler 810 (e.g., an electromagnetic clutch) of the example damping system 622. The coupler controller 1210 generates and transmits instruction(s) to cause the coupler 810 to be actuated such that the driven member 626 (FIG. 6) of the first damper 623 of the damping system 622 is operatively coupled to the vane shaft 804 (FIG. 8) of the second damper 800 via the coupler 810. In the example of FIG. 12, the coupler controller 1210 generates the instruction(s) to activate the coupler 810 in response to the determination by the sensor data analyzer 1206 that the fluid property data exceeds the threshold(s) define by the damping rule(s) 1208 (e.g., fluid temperature is above 100°, fluid flow rate is above 35 GPM, etc.).

As disclosed herein, the activation of the coupler 810 provides for an operative coupling between the first damper 623 of the damping system 622 and the second damper 800 of the damping system 622. In particular, activation of the coupler 810 enables the second damper 800 of the damping system 622 to augment the damping forces provided by the first damper 623 of the damping system 622. The damping provided by the first damper 623 and the second damper 800 counter oscillations at the flexure tube 606 (FIG. 6) of the EHSV 601.

In some examples, the sensor data analyzer 1206 detects changes in, for example, temperature of the hydraulic fluid based on the sensor data generated by the sensor(s) 808. For example, the sensor data analyzer 1206 can detect a decrease in a temperature of the fluid. In such examples, the sensor data analyzer 1206 may determine that the damping provided by the first damper 623 is sufficient to reduce or substantially eliminate oscillations at the electro-hydraulic system 600 (e.g., based on the damping rule(s) 1208) and, thus, the additional damping provided by the second damper 800 of the damping system 622 is no longer warranted. In such examples, the coupler controller 1210 can generate an instruction for the coupler 810 to be deactivated to interrupt the operative coupling between the first and second dampers 623, 800 of the damping system 622.

While an example manner of implementing the damping controller 1202 is illustrated in FIG. 12, one or more of the elements, processes and/or devices illustrated in FIG. 12 may be combined, divided, re-arranged, omitted, eliminated and/or implemented in any other way. Further, the example database 1204, the example sensor data analyzer 1206, the example coupler controller 1210, and/or, more generally, the example damping controller 1202 of FIG. 12 may be implemented by hardware, software, firmware and/or any combination of hardware, software and/or firmware. Thus, for example, any of the example database 1204, the example sensor data analyzer 1206, the example coupler controller 1210, and/or, more generally, the example damping controller 1202 of FIG. 12 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 1204, the example sensor data analyzer 1206, and/or the example coupler controller 1210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example damping controller 1202 of FIG. 12 may include one or more elements, processes and/or devices in addition to, or instead of, those illustrated in FIG. 12, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13A:
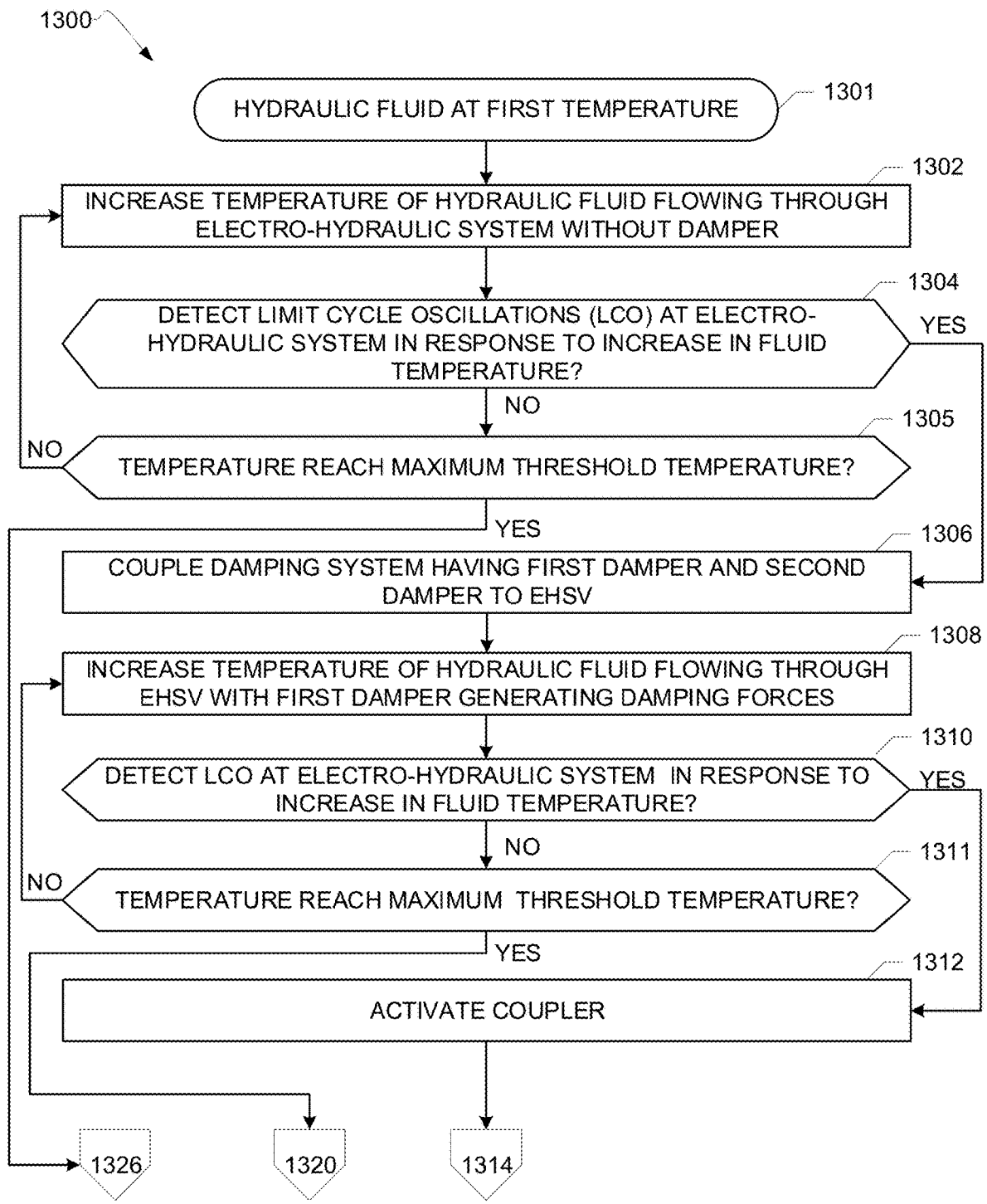
FIGS. 13A and 13B include a flowchart of example method for selecting design parameters of the example damping system of FIGS. 6-11.
Figure 13B:
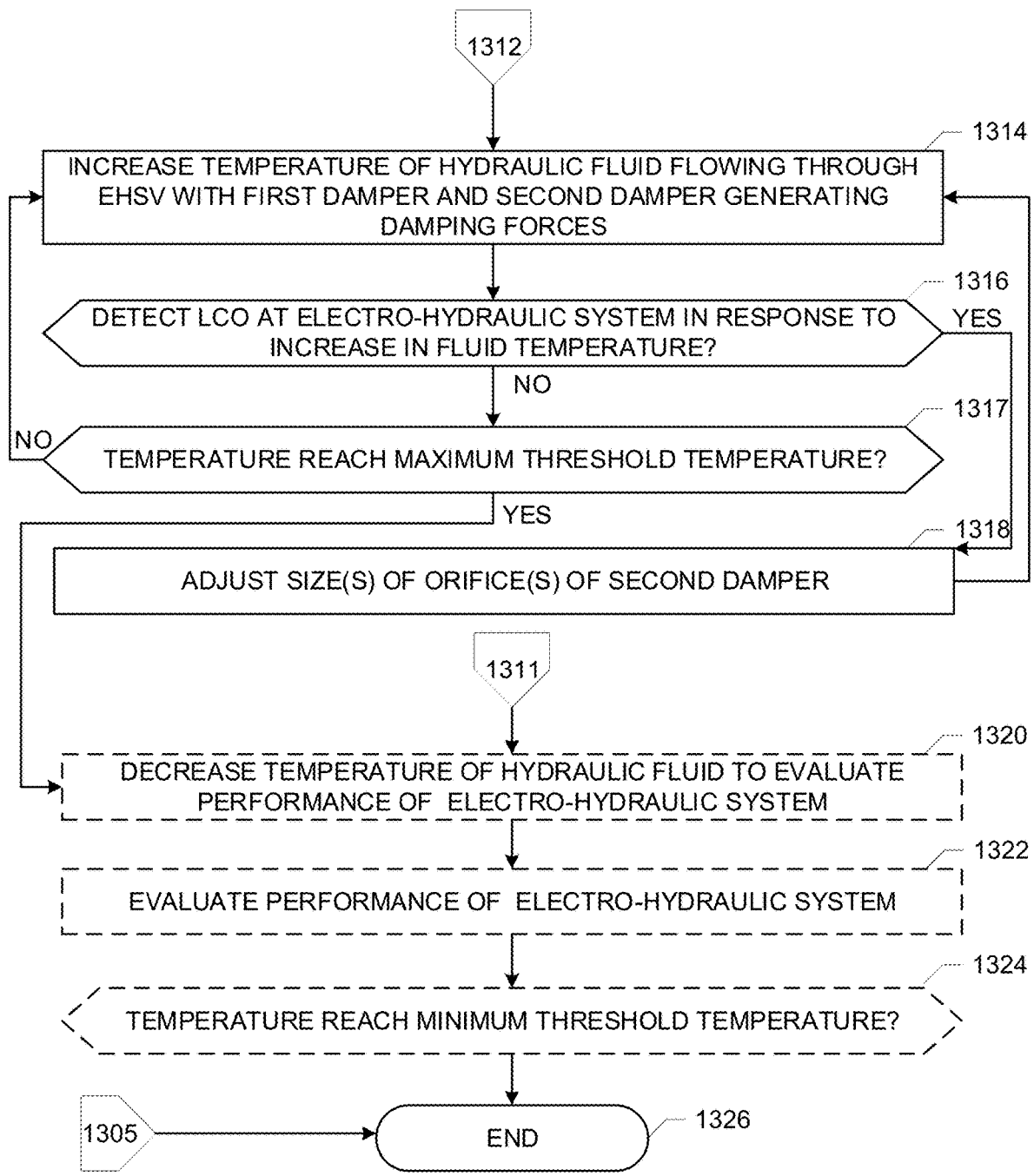

FIGS. 13A and 13B include a flowchart of an example method 1300 for selecting design parameters of a damping system for use with an electro-hydraulic servo-valve (EHSV) of an electro-hydraulic system that also includes a hydraulic actuator. The example method 1300 may be implemented in connection with the example damping system 622 of FIGS. 6-12 including the first damper 623 and the second damper 800.

In the example of FIG. 13, hydraulic fluid provided to an electro-hydraulic system (e.g., the electro-hydraulic system 600 of FIG. 6) has a first temperature at a first time (block 1301). The example method 1300 includes increasing a temperature of hydraulic fluid provided to the electro-hydraulic system, where the electro-hydraulic system does not include a damper (block 1302). In some examples, the temperature is increased in intervals of, for instance, 20° F. For example, a temperature of hydraulic fluid flowing through the EHSV 601 of the example electro-hydraulic system 600 of FIG. 6 can be increased at the hydraulic fluid source 111 prior to being received at the EHSV 601. The temperature of the fluid can range from 60° F. to 275° F.

The example method 1300 includes determining whether limit cycle oscillations (LCO) are detected at the electro-hydraulic system in response to the increase in fluid temperature (block 1304). For example, oscillations of the flexure tube 606 and/or the nozzle 608 of the EHSV 601 can be detected by the sensor(s) 402, 633, 808 (e.g., vibration sensor(s)) during operation of the EHSV 601. Additionally or alternatively, the sensor(s) 402, 633, 808 can measure oscillations at the actuator 620. The signal data generated by the sensor(s) 402, 633, 808 is analyzed by the sensor data analyzer 1206 of the example damping controller 1202 of FIG. 12 to determine the amount of oscillation. The sensor data analyzer 1206 can compare the sensor data to pre-defined oscillation threshold(s) to determine if the oscillations exceed the threshold.

If LCO are not detected at block 1304, the example method 1300 continues to increase the temperature of the hydraulic fluid until the temperature reaches a maximum threshold temperature (block 1305). The maximum threshold temperature can be user defined. The maximum threshold temperature can be user defined. For instance, the maximum threshold temperature can be 275° F. If the maximum temperature threshold has been reached and no LCO are detected at the electro-hydraulic system, then the example method 1300 ends (block 1326). In such instances, no damping may be needed at the electro-hydraulic system.

The example method 1300 of FIGS. 13A and 13B includes coupling a damping system to the EHSV including a first damper and a second damper (block 1306). For example, the damping system 622 including the first damper 623 and the second damper 800 can be coupled to the EHSV 601 of FIG. 5. The first damper 623 can be coupled to the EHSV 601 of FIG. 6 such that motion of the flexure tube 606 is transferred to the driving member 624 of the first damper 623. The dimensions of the length of the driving member 624 and/or the width of the driven member 626 of the first damper 623 can be selected based on, for example, fluid flow rates and/or an amount of oscillations at the EHSV 601 as disclosed in connection with FIGS. 1-5.

The example method 1300 of FIGS. 13A and 13B includes increasing the temperature of the fluid delivered to the EHSV, where the first damper is providing damping forces (block 1308). As disclosed herein, movement of the driving member 624 and the driven member 626 of the first damper 623 generates damping forces to counter oscillations of, for instance, the flexure tube 606 of the EHSV 601.

The example method 1300 of FIGS. 13A and 13B includes determining if limit cycle oscillations are detected at the electro-hydraulic system when the first damper is generating damping forces (block 1310). For example, the sensor data analyzer 1206 of the damping controller 1202 of FIG. 12 can compare data generated by the sensor(s) 402, 633, 808 during operation of the EHSV 601 including the damping system 622 of FIGS. 6-12 to the sensor data generated prior to the addition of the damping system 622. The temperature of the fluid at which oscillations occurred at the EHSV 601 despite the damping forces provided by the first damper 623 can be stored as a reference value in the database 1204 (e.g., for use during operation of the EHSV 601 as disclosed in connection with FIG. 14).

If LCO are not detected at block 1310, the example method 1300 continues to increase the temperature of the hydraulic fluid until the temperature reaches the maximum threshold temperature (block 1311). If the maximum temperature threshold has been reached and no LCO are detected at the electro-hydraulic system, then the example method 1300 continues to block 1320 to evaluate performance of the electro-hydraulic system in view of the activation of the first damper. In such examples, the first damper provides sufficient damping for the electro-hydraulic system without activation of the second damper.

In the example of FIGS. 13A and 13B, if there are continued oscillations at the electro-hydraulic system despite the damping forces provided by the first damper, the example method 1300 includes activating a coupler (e.g., an electromagnetic clutch) to enable the second damper to provide damping forces to the electro-hydraulic servo system (block 1312). For example, the coupler controller 1210 of the example damping controller 1202 generates an instruction to cause the coupler 810 of FIG. 8 to operatively couple the first damper 623 and the second damper 800.

The example method 1300 includes increasing the temperature of the fluid delivered to the EHSV, where the first damper and the second damper are generating damping forces (block 1314). As disclosed herein, during operation of the second damper 800 of FIGS. 8-12, rotation of the vane 806 causes fluid to move between the chambers 900, 902, 904, 906 of the housing 802, thereby generating damping forces as result of fluid pressure changes.

The example method 1300 of FIGS. 13A and 13B includes determining if limit cycle oscillations are detected at the electro-hydraulic system when the first damper and the second damper are generating damping forces (block 1316). If LCO are not detected at block 1316, the example method 1300 continues to increase the temperature of the hydraulic fluid until the temperature reaches the maximum threshold temperature (block 1317). If the maximum temperature threshold has been reached and no LCO are detected at the electro-hydraulic system, then the example method 1300 continues to block 1320 to evaluate performance of the electro-hydraulic system. In such examples, the first damper and the second damper provide sufficient damping for the electro-hydraulic system.

In the example of FIGS. 13A and 13B, if oscillations are detected at the electro-hydraulic servo system despite the damping forces provided by the first and second dampers (block 1316), the example method 1300 includes adjusting a size of the orifices of the chambers of the second damper to increase the amount of damping provided by the damping system (block 1318). For example, a diameter of the orifices 908, 910, 912, 914 of FIGS. 9-11 can range from 0.005 inches to 0.15 inches, where a smaller diameter provides for increased fluid pressure changes and, thus, increased damping forces. The example method 1300 continues to monitor for LCO at the electro-hydraulic system in view of the adjustments to the size of the orifices of the chambers of the second damper (blocks 1314, 1316, 1317).

In some examples, the method 1300 of FIGS. 13A and 13B includes characterizing a performance of the electro-hydraulic system in view of the addition of the damping system including the first damper and the second damper to the electro-hydraulic system. For example, when oscillations detected at the electro-hydraulic system are below a threshold and/or substantially eliminated as a result of the damping provided by the damping system and the maximum temperature threshold of the fluid has been reached (blocks 1311, 1317), the example method 1300 includes decreasing a temperature of the hydraulic fluid provided to the EHSV (e.g., the EHSV 601 of FIG. 7) to evaluate performance of the hydraulic actuator in view of the addition of the damper (block 1320). In such examples, performance metrics such as a rate at which the actuator 620 is loaded with hydraulic fluid from the EHSV 601 of FIG. 6 can be evaluated as disclosed in connection with the example method 500 of FIG. 5 (block 1322).

The evaluation of the electro-hydraulic system continues until the fluid temperature is decrease to a minimum threshold temperature (block 1324). The minimum threshold temperature can be user defined. For instance, the minimum threshold temperature can be −65° F. If the fluid temperature has been decreased to the minimum threshold temperature, the method 1300 of FIG. 6 ends (block 1326).

Figure 14:
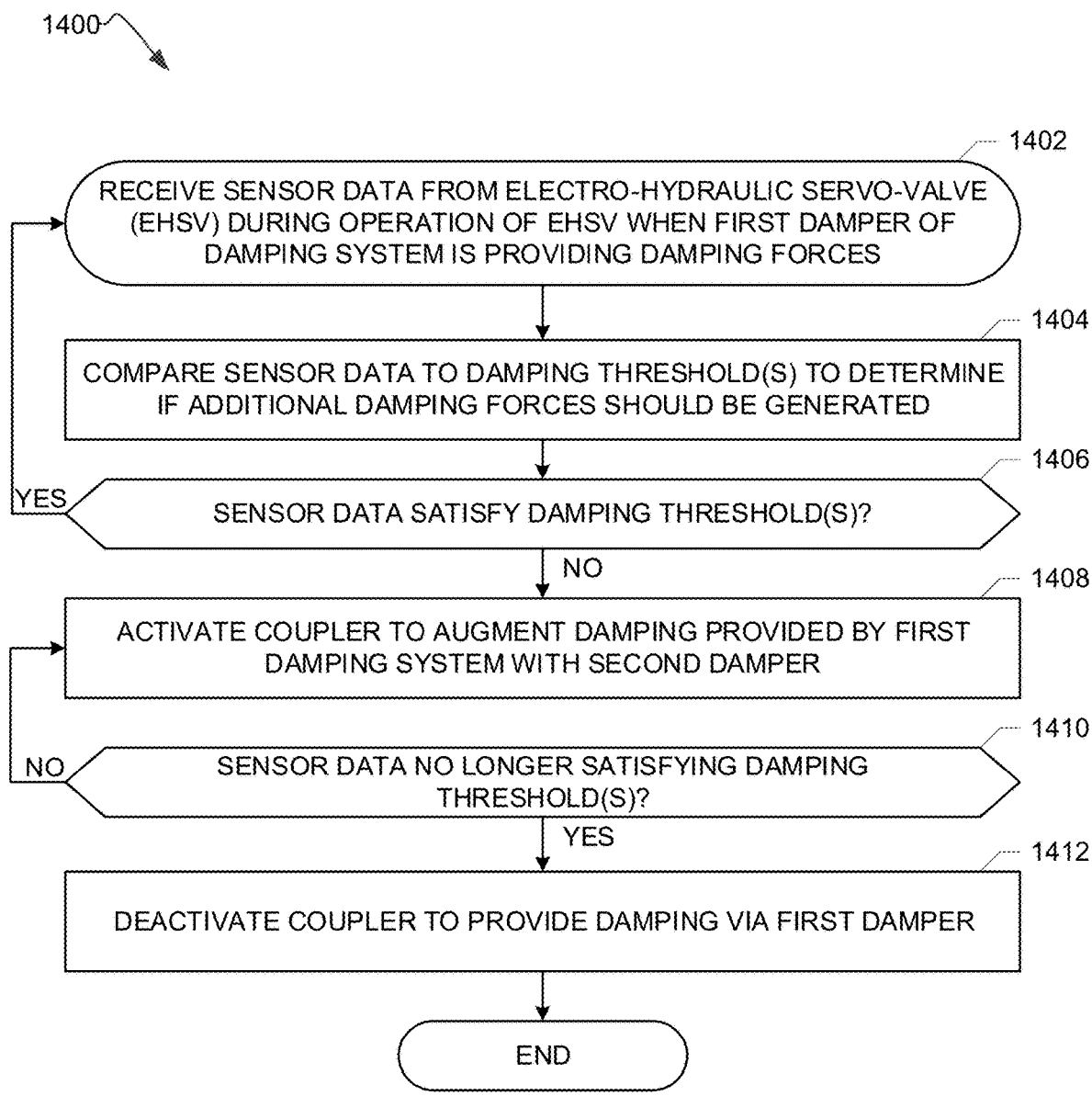
FIG. 14 is a flowchart representative of machine readable instructions which may be executed to implement the example damping controller of FIG. 12.

FIG. 14 is a flowchart of an example method 1400 to determine if additional damping should be provided by a damping system of an electro-hydraulic servo-valve (EHSV) during operation of the EHSV, such as the EHSV 601 of FIG. 6. The example method 1400 can be implemented by the example damping controller 1202 of FIG. 12 to control the example damping system 622 of FIGS. 6-12. In some examples, the example method 1400 is executed to enable the EHSV 601 to meet a fluid flow output rate demanded by the actuator 620 without LCO.

In the example method 1400, sensor data is received from the sensor(s) of the EHSV when a first damper of a damping system is generating damping forces (block 1402). The sensor data can include, for example, temperature data, flow rate data, and/or vibration data. The sensor data can be generated by the sensor(s) 402, 633, 808 of the EHSV 601 of FIG. 6 and transmitted to the damping controller 1202 of FIG. 12 via one or more wired or wireless communication protocols.

The example method 1400 includes comparing the sensor data to one or more damping thresholds to determine if additional damping should be generated (block 1404). For example, if the sensor data analyzer 1206 of the example damping controller 1202 of FIG. 12 determines that the temperature of the fluid in the EHSV 601 satisfies a temperature threshold defined by the damping rules 1208, the sensor data analyzer 1206 determines that additional damping should be provided at the EHSV 601. The temperature threshold can be defined by a temperature of the fluid at which oscillations occurred at the EHSV 601 despite the damping forces provided by the first damper 623 (e.g., the referenced value determined via the example method 1300 of FIGS. 13A and 13B (block 1310)).

If additional damping is to be provided during operation of the EHSV (block 1406), the example method 1400 includes activating an electromagnetic clutch of the damping system to operatively couple the first damper to a second damper of the damping system (block 1408). For example, the coupler controller 1210 of the example damping controller 1202 of FIG. 12 generates an instruction to activate the coupler 810 of FIG. 8 to operatively couple the first damper 623 to the second damper 800 (e.g., via the driven member 626 of the first damper 623 and the vane shaft 804 of the second damper 800). As a result of the coupling between the first damper 623 and the second damper 800, damping forces generated by the movement of fluid in the housing 802 of the second damper 800 (e.g., due to rotation of the vane 806) are provided to the flexure tube 606 of the EHSV 601 to increase the damping provided by the damping system 622.

The example method 1400 continues to monitor the sensor data to detect changes in the conditions at the EHSV (block 1410). If the sensor data indicates changes in conditions at the EHSV with respect to fluid temperature, flow rate, and/or vibrations the EHSV and/or actuator, such that the oscillations of at the EHSV can be damped by the first damper alone, the example method 1400 includes deactivating the electromagnetic clutch (block 1412). For example, if the damping controller 1202 of FIG. 12 determines that the temperature of the fluid has decreased below a threshold and, thus, fluid viscosity increased, the damping controller 1202 may deactivate the coupler 810 such that damping is provided by (e.g., only provided by) the first damper 623 of the damping system 622.

One or more elements of the flowcharts are FIGS. 5, 13, and/or 14 are representative of example hardware logic, machine readable instructions, hardware implemented state machines, and/or any combination thereof for implementing the example damping controllers 404, 1202 of FIGS. 4 and/or 12. The machine readable instructions may be one or more executable programs or portion(s) of an executable program for execution by a computer processor and/or processor circuitry, such as the processor(s) 1512, 1612 shown in the example processor platform(s) 1500, 1600 discussed below in connection with FIGS. 15 and/or 16. The programs may be embodied in software stored on a non-transitory computer readable storage medium such as a CD-ROM, a floppy disk, a hard drive, a DVD, a Blu-ray disk, or a memory associated with the processor(s) 1512, 1612 but the entire programs and/or parts thereof could alternatively be executed by a device other than the processor(s) 1512, 1612 and/or embodied in firmware or dedicated hardware. Further, although the example program(s) are described with reference to the flowcharts illustrated in FIGS. 4, 13, and/or 14, many other methods of implementing the example damping controllers 404, 1202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, one or more elements of the example processes of FIGS. 4, 13, and/or 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 15:
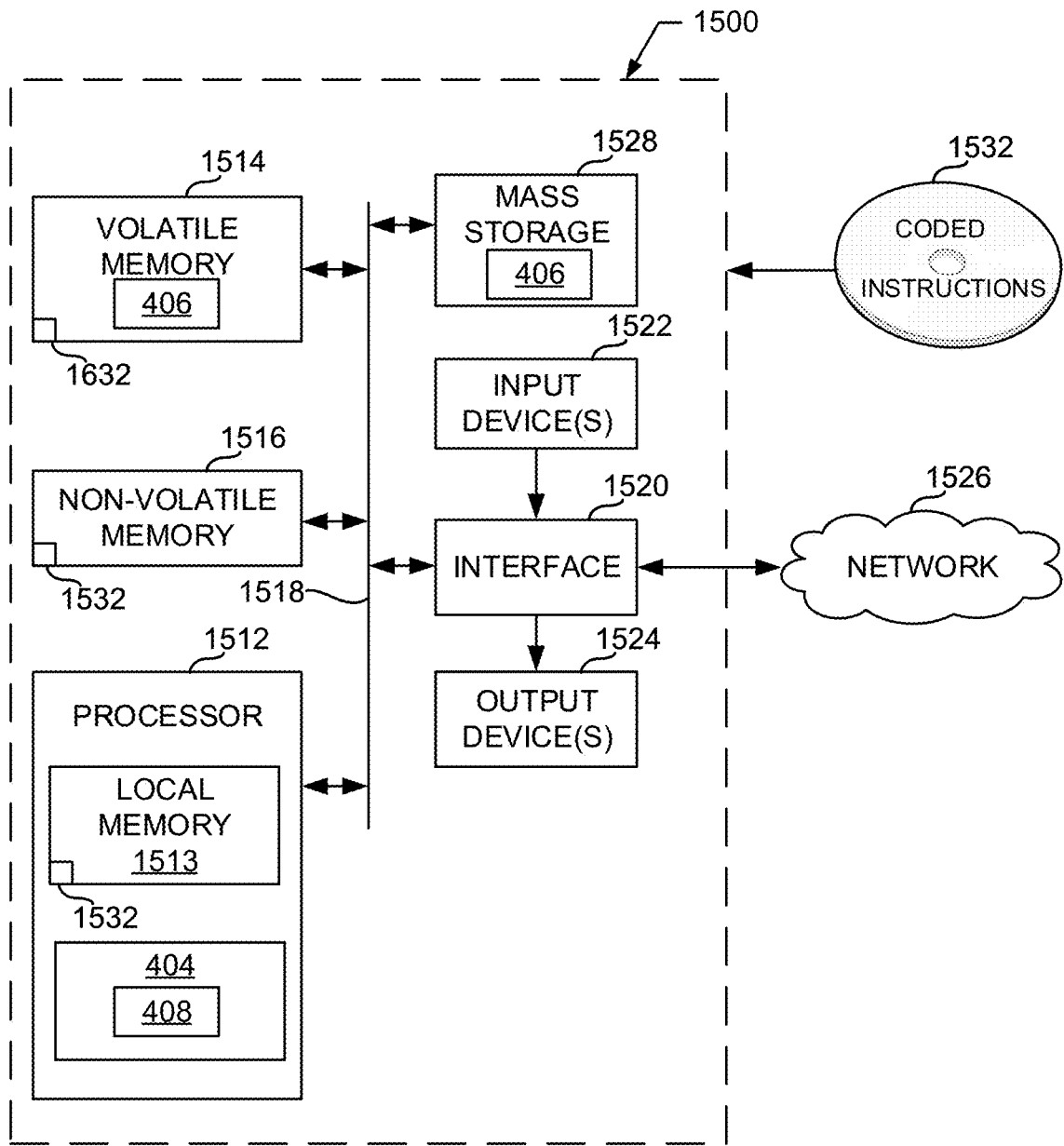
FIG. 15 is a block diagram of an example processing platform structured to execute the instructions of FIG. 5 to implement the example damping controller of FIG. 4.

FIG. 15 is a block diagram of an example processor platform 1500 structured to execute the instructions of FIG. 5 to implement the damping controller 404 of FIG. 4. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the sensor data analyzer 408.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

Coded instructions 1532 of FIG. 15 may be stored in the mass storage device 1528, in the volatile memory 1514, in the non-volatile memory 1516, and/or on a removable non-transitory computer readable storage medium such as a CD or DVD.

Figure 16:
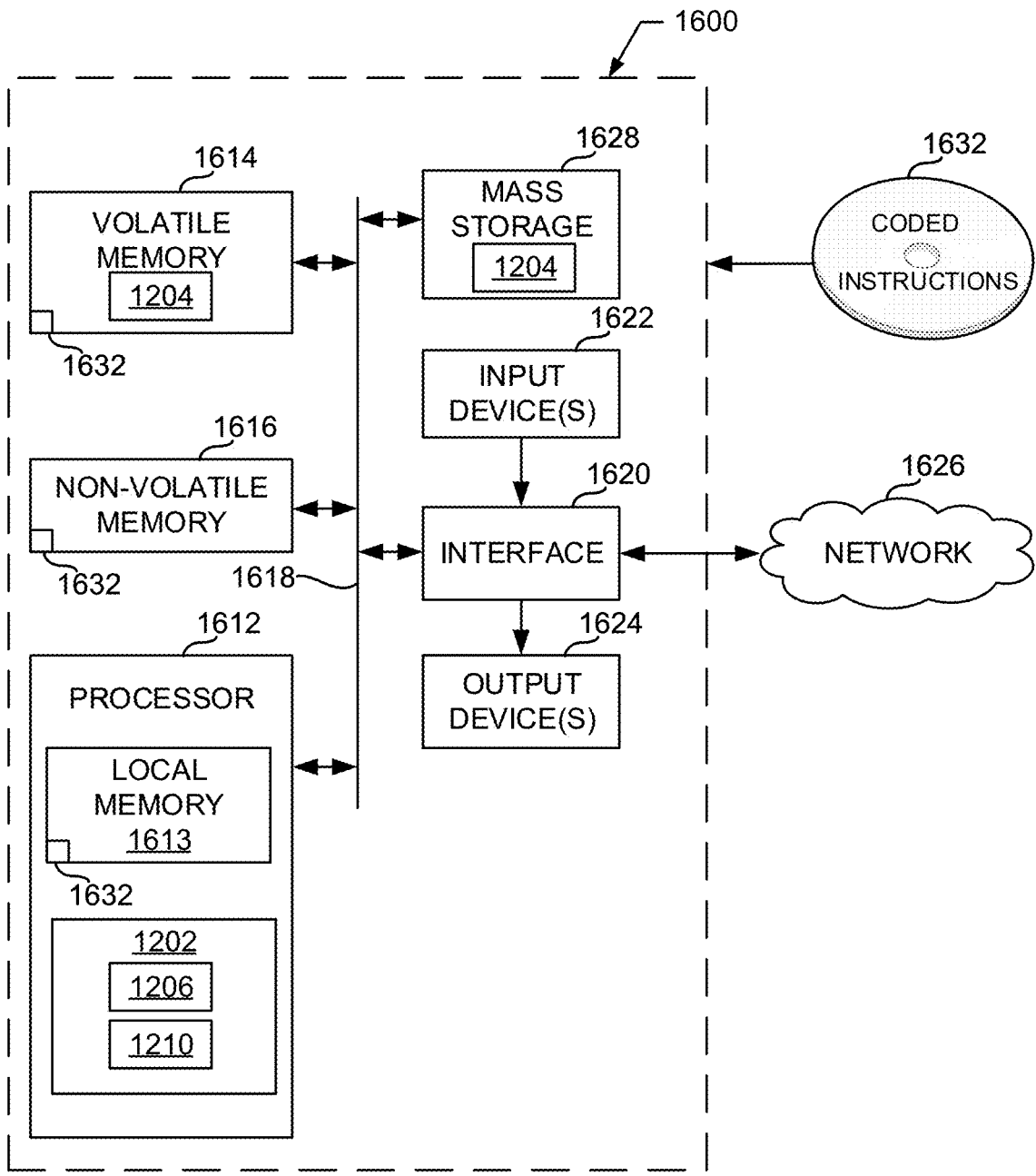
FIG. 16 is a block diagram of an example processing platform structured to execute the instructions of FIG. 14 to implement the example damping controller of FIG. 12.

FIG. 16 is a block diagram of an example processor platform 1600 structured to execute the instructions of FIG. 14 to implement the damping controller 1202 of FIG. 12. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the sensor data analyzer 1206 and the coupler controller 1210.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

Coded instructions 1632 of FIG. 16 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that provide for damping at an electro-hydraulic servo-valve (EHSV) to reduce or substantially eliminate oscillations at the EHSV. Example dampers disclosed herein provide for damping forces that counter oscillations that the EHSV in view of changes in fluid temperature and/or fluid flow rates of hydraulic fluid at the EHSV without substantially increasing the weight of the EHSV. Some example dampers disclosed herein provide for selective control of the amount of damping provided to, for instance, increase damping forces in response to increased fluid flow rates at the EHSV. Example dampers disclosed herein prevent the oscillations from propagating throughout an electro-hydraulic system and, thus, provide for increased stability of the electro-hydraulic system.

Example 1 includes an electro-hydraulic servo-valve includes an inlet to receive a fluid from a reservoir; a torque motor; a chamber, the fluid to return to reservoir via the chamber; a flexure tube coupled to the torque motor, at least a portion of the flexure tube disposed in the chamber, the flexure tube including a nozzle to deliver the fluid to an actuator; and a damper operatively coupled to the flexure tube, the damper disposed in the chamber.

Example 2 includes the electro-hydraulic servo-valve of example 1, wherein the damper includes a driving member and a driven member, and wherein movement of the flexure tube is to cause movement of the driving member.

Example 3 includes the electro-hydraulic servo-valve of example 2, wherein the driven member at least partially surrounds the driving member, the driving member and the driven member to pivot relative to one another in response to movement of the flexure tube.

Example 4 includes the electro-hydraulic servo-valve of examples 2 or 3, wherein the fluid is a first fluid, the chamber is a first chamber and the damper further includes a housing including a first portion including a second fluid disposed therein, the second fluid being one of the same as the first fluid or different than the first fluid; a shaft disposed in the first portion, the shaft operatively coupled to the driven member; and a vane disposed in the first portion, the vane rotatably coupled to the shaft, the vane to cause movement of the second fluid in first portion to generate damping forces.

Example 5 includes the electro-hydraulic servo-valve of example 4, wherein the damping forces generated in response to movement of the fluid and damping forces generated by the movement of the driving member and the driven member are to be transmitted to the flexure tube to counter oscillations at the nozzle.

Example 6 includes the electro-hydraulic servo-valve of example 4, wherein the first portion of the housing defines a first chamber and a second chamber and wherein rotation of the vane is to cause the fluid in the second chamber to move through an orifice, a pressure of the fluid to change via the orifice.

Example 7 includes the electro-hydraulic servo-valve of example 4, further including an electromagnetic coupler to operatively couple the shaft to the driven member.

Example 8 includes a system including an electro-hydraulic servo-valve, the electro-hydraulic servo-valve including a first damper; a second damper; and a coupler disposed between the first damper and the second damper. The example system includes a processor to generate an instruction to activate the coupler to operatively couple the first damper and the second damper to provide for damping at the electro-hydraulic servo-valve via the first damper and the second damper.

Example 9 includes the system of example 8, wherein the electro-hydraulic servo-valve includes a flexure tube and the first damper includes a driving member and a driven member, the driving member operably coupled to the flexure tube.

Example 10 includes the system of examples 8 or 9, wherein the second damper includes a housing containing fluid therein; a shaft, the shaft coupled to the coupler; and a vane rotatably coupled to the shaft, the vane to cause movement of the fluid in the housing when the second damper is operatively coupled to the first damper via the coupler.

Example 11 includes the system of example 10, wherein the housing defines a first chamber and a second chamber, the fluid to move between the first chamber and the second chamber in response to the rotation of the vane.

Example 12 includes the system of example 10, wherein the coupler is coupled to the driven member and the shaft.

Example 13 includes the system of example 8, wherein the electro-hydraulic servo-valve further includes a sensor to generate sensor data indicative of a temperature of a fluid received at the electro-hydraulic servo-valve, the processor to generate the instruction to activate the coupler in response to the sensor data.

Example 14 includes the system of example 8, wherein the processor is to generate the instruction to activate the coupler in response to a flow rate of a fluid to be output to an actuator fluidly coupled to the electro-hydraulic servo-valve.

Example 15 includes an apparatus including a first damper including a driving member and a driven member, the driven member to pivot in response to movement of the driving member; a second damper including a shaft and a vane, the vane to control movement of a fluid in response to rotation of the shaft; and a coupler to operatively couple the first damper to the second damper via the driven member and the shaft.

Example 16 includes the apparatus of example 15, wherein the driven member at least partially encloses the driving member.

Example 17 includes the apparatus of examples 15 or 16, further including a controller to selectively actuate the coupler to cause the operative coupling of the first damper and the second damper.

Example 18 includes the apparatus of examples 15 or 16, wherein the driving member is to be coupled to a flexure tube of an electro-hydraulic servo-valve, the driving member to actuate the driven member in response to movement of the flexure tube.

Example 19 includes the apparatus of examples 15 or 16, wherein the second damper includes a housing to contain the fluid, the housing defining a first chamber and a second chamber, the fluid to move between the first chamber and the second chamber via a first orifice in response to rotation of the vane.

Example 20 includes the apparatus of example 19, wherein the housing includes a third chamber and a fourth chamber, the fluid to move between the third chamber and the fourth chamber via a second orifice in response to rotation of the vane.

Example 21 includes a method including actuating, via a driving member of a first damper of an electro-hydraulic servo-valve, a driven member of the first damper, the first damper to dampen the movement of the flexure tube and selectively actuating, via a controller, a coupler to cause a second damper of the electro-hydraulic servo-valve to be operatively coupled to the first damper, the first damper and the second damper to dampen the movement of the flexure tube when the first damper and the second damper are operatively coupled.

Example 22 includes the method of example 21, further including performing, via the controller, a comparison of one or more of a temperature or a flow rate of a fluid received by the electro-hydraulic servo-valve to a threshold and actuating the coupler in response to the one or more of the temperature or the flow rate exceeding the threshold.

Example 23 includes the method of examples 21 or 22, wherein the actuating of the driven member of the first damper is to cause movement of fluid in a chamber of the electro-hydraulic servo-valve, the movement of the fluid to counter the movement of the flexure tube.

Example 24 includes the method of any of examples 21-23, further including causing, in response to the operative coupling of the first damper and the second damper, a shaft of the second damper to rotate.

Example 25 includes the method of any of examples 21-23, wherein actuating the coupler includes activating an electromagnetic clutch.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
   an electro-hydraulic servo-valve, the electro-hydraulic servo-valve including:
      a first damper;
      a second damper; and
      a coupler disposed between the first damper and the second damper; and
   processor circuitry to cause the coupler to operatively couple the first damper and the second damper to provide for damping at the electro-hydraulic servo-valve via the first damper and the second damper.

2. The system of claim 1, wherein the electro-hydraulic servo-valve includes a flexure tube and the first damper includes a driving member and a driven member, the driving member operatively coupled to the flexure tube.

3. The system of claim 2, wherein the second damper includes:
   a housing containing fluid therein;
   a shaft, the shaft coupled to the coupler; and
   a vane rotatably coupled to the shaft, the vane to cause movement of the fluid in the housing when the second damper is operatively coupled to the first damper via the coupler.

4. The system of claim 3, wherein the housing defines a first chamber and a second chamber, the fluid to move between the first chamber and the second chamber in response to the rotation of the vane.

5. The system of claim 3, wherein the coupler is coupled to the driven member and the shaft.

6. The system of claim 5, wherein the coupler is to transfer torque from the driven member to the shaft to cause the vane to rotate.

7. The system of claim 3, wherein the fluid contained in the housing is different than a fluid received at the electro-hydraulic servo-valve.

8. The system of claim 1, wherein the electro-hydraulic servo-valve further includes a sensor to generate first sensor data indicative of a first temperature of a fluid received at the electro-hydraulic servo-valve at a first time, the processor circuitry to activate the coupler cause the coupler to operatively couple the first damper and the second damper in response to the first sensor data.

9. The system of claim 8, wherein the processor circuitry is to deactivate the coupler in response to second sensor data indicative of a second temperature of the fluid at a second time, the second time after the first time.

10. The system of claim 1, wherein the processor circuitry is to cause the coupler to operatively couple the first damper and the second damper in response to a flow rate of a fluid to be output to an actuator fluidly coupled to the electro-hydraulic servo-valve.

11. The system of claim 1, wherein the electro-hydraulic servo-valve further includes an accelerometer and the processor circuitry is to cause the coupler to operatively couple the first damper and the second damper in response to outputs of the accelerometer.

12. An apparatus comprising:
   a first damper including a driving member and a driven member, the driven member to pivot in response to movement of the driving member;
   a second damper including a shaft and a vane, the vane to control movement of a fluid in response to rotation of the shaft; and
   a coupler to operatively couple the first damper to the second damper via the driven member and the shaft.

13. The apparatus of claim 12, wherein the driven member at least partially encloses the driving member.

14. The apparatus of claim 13, further including processor circuitry to selectively actuate the coupler to cause the operative coupling of the first damper and the second damper.

15. The apparatus of claim 14, wherein the processor circuitry is to actuate the coupler to cause the operative coupling of the first damper and the second damper in response to one or more of a temperature of a fluid received at an electro-hydraulic servo-valve or a viscosity of the fluid received at the electro-hydraulic servo-valve.

16. The apparatus of claim 12, wherein the driving member is to be coupled to a flexure tube of an electro-hydraulic servo-valve, the driving member to actuate the driven member in response to movement of the flexure tube.

17. The apparatus of claim 12, wherein the second damper includes a housing to contain the fluid, the housing defining a first chamber and a second chamber, the fluid to move between the first chamber and the second chamber via a first orifice in response to rotation of the vane.

18. The apparatus of claim 17, wherein the housing includes a third chamber and a fourth chamber, the fluid to move between the third chamber and the fourth chamber via a second orifice in response to rotation of the vane.

19. The apparatus of claim 18, wherein the first orifice and the second orifice are fluidly coupled to a fluid conduit, the fluid to move between the first chamber, the second chamber, the third chamber, and the fourth chamber via the fluid conduit.

20. The apparatus of claim 17, wherein the housing includes a first stop and a second stop, the vane to move in a first rotational direction and a second rotational direction between the first stop and the second stop.

* * * * *